US008068496B2

(12) United States Patent
Suzuki

(10) Patent No.: US 8,068,496 B2
(45) Date of Patent: Nov. 29, 2011

(54) METHOD AND APPARATUS FOR RADIO COMMUNICATION

(75) Inventor: Masaaki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 11/987,089

(22) Filed: Nov. 27, 2007

(65) Prior Publication Data

US 2008/0123567 A1 May 29, 2008

(30) Foreign Application Priority Data

Nov. 29, 2006 (JP) ................................. 2006-322367

(51) Int. Cl.
*H04L 12/28* (2006.01)

(52) U.S. Cl. ........ 370/394; 370/428; 370/236; 370/389; 370/329; 370/468

(58) Field of Classification Search ................. 370/331, 370/277, 278, 329, 389, 394, 468
See application file for complete search history.

(56) References Cited

U.S. PATENT DOCUMENTS

| | | | | |
|---|---|---|---|---|
| 6,134,237 A * | 10/2000 | Brailean et al. | ............... | 370/394 |
| 6,161,207 A * | 12/2000 | Lockhart et al. | ............... | 714/758 |
| 6,301,249 B1 * | 10/2001 | Mansfield et al. | ............ | 370/394 |
| 6,389,016 B1 * | 5/2002 | Sabaa et al. | ..................... | 370/394 |
| 7,116,651 B2 * | 10/2006 | Hakkinen et al. | ............. | 370/329 |
| 7,254,769 B2 * | 8/2007 | Kim et al. | ...................... | 714/774 |
| 7,283,508 B2 * | 10/2007 | Choi et al. | ...................... | 370/341 |
| 7,310,336 B2 * | 12/2007 | Malkamaki | ................... | 370/392 |
| 7,327,735 B2 | 2/2008 | Robotham et al. | | |
| 7,444,169 B2 * | 10/2008 | Ishii et al. | ...................... | 455/561 |
| 7,486,638 B2 * | 2/2009 | Ofuji et al. | ..................... | 370/329 |
| 7,539,207 B2 * | 5/2009 | Frederiksen et al. | ......... | 370/465 |
| 7,539,917 B2 * | 5/2009 | Zhuyan | ......................... | 714/749 |
| 2004/0100964 A1 | 5/2004 | Robotham et al. | | |
| 2004/0223507 A1* | 11/2004 | Kuchibhotla et al. | ......... | 370/428 |
| 2005/0135253 A1* | 6/2005 | Cai et al. | ........................ | 370/236 |
| 2005/0235190 A1* | 10/2005 | Miyazaki et al. | ............. | 714/748 |

(Continued)

FOREIGN PATENT DOCUMENTS

JP 2004180295 6/2004

(Continued)

OTHER PUBLICATIONS

"6.7 ACK/NACK Transmit Power Reduction for HS-DPCCH With Preamble And Postamble"; 3GPP TR 25.899 V6.1.0, 3rd Generation Partnership Project; Technical Specification Group Radio Access Network; High Speed Download Packet Access (HSDPA) enhancements; (Release 6), Sep. 2004.

(Continued)

*Primary Examiner* — Gary Mui
*Assistant Examiner* — Dewanda Samuel
(74) *Attorney, Agent, or Firm* — Murphy & King, P.C.

(57) ABSTRACT

A radio communication apparatus add an information element (ACK/NACK information element) indicating a reception result of a received signal of a transmission sequence number to the another information element (Other ACK/NACK information element) indicating a reception result of a received signal of another transmission sequence number, which information elements are transmitted to the another radio communication apparatus; and the another radio communication apparatus judges a reception result of the transmitted signal on the basis of the information element and the another information element received from the radio communication apparatus.

18 Claims, 25 Drawing Sheets

U.S. PATENT DOCUMENTS

| | | | |
|---|---|---|---|
| 2005/0254463 A1* | 11/2005 | Suzuki et al. | 370/335 |
| 2006/0104242 A1* | 5/2006 | Kim et al. | 370/329 |
| 2010/0027538 A1* | 2/2010 | Harada et al. | 370/389 |

FOREIGN PATENT DOCUMENTS

| | | |
|---|---|---|
| JP | 2005-051713 | 2/2005 |
| JP | 2006270788 | 10/2006 |

OTHER PUBLICATIONS

"8.10 Performance of ACK/NACK Detection for HS-DPCCH"; 3GPP TS 25.104 V7.4.0, 3rd Generation Partnership Project; Technical Specification Group Radio Access Network; Base Station (BS) radio transmission and reception (FDD); (Release 7), Jun. 2006.

Japanese Notice of Reasons for Rejection dated Jun. 21, 2011 for application No. 2006-322367.

* cited by examiner

FIG. 5

| PRE | Own ACK/NACK | POST | Other ACK/NACK | | | | |
|-----|--------------|------|------|------|------|------|------|
| | | | #N-1 | #N-2 | #N-3 | #N-4 | #N-5 |
| PRE | 1 | POST | 6 | 5 | 4 | 3 | 2 |
| PRE | 2 | POST | 1 | 6 | 5 | 4 | 3 |
| PRE | 3 | POST | 2 | 1 | 6 | 5 | 4 |
| PRE | 4 | POST | 3 | 2 | 1 | 6 | 5 |
| PRE | 5 | POST | 4 | 3 | 2 | 1 | 6 |
| PRE | 6 | POST | 5 | 4 | 3 | 2 | 1 |

THE NUMBERS ABOVE REPRESENT THE PROCESS NUMBERS

FIG. 6

| Own ACK/NACK | Other ACK/NACK | | | | |
| --- | --- | --- | --- | --- | --- |
| | #N-1 | #N-2 | #N-3 | #N-4 | #N-5 |
| 1 1 1 1 1 1 | — | — | — | — | — |
| — | 1 1 | — | — | — | — |
| — | — | 1 0 | — | — | — |
| — | — | — | 0 0 | — | — |
| — | — | — | — | 1 1 | — |
| — | — | — | — | — | 1 1 |

THE NUMBERS ABOVE REPRESENT ACK/NACK DATA BIT

FIG. 7

| PRE | Own ACK/NACK | POST | Other ACK/NACK | |
|---|---|---|---|---|
| | | | #N-1 | #N-2 |
| PRE | 1 | POST | 6 | 5 |
| PRE | 2 | POST | 1 | 6 |
| PRE | 3 | POST | 2 | 1 |
| PRE | 4 | POST | 3 | 2 |
| PRE | 5 | POST | 4 | 3 |
| PRE | 6 | POST | 5 | 4 |

THE NUMBERS ABOVE REPRESENT THE PROCESS NUMBERS

FIG. 11

| | | Input Signal | Weight | Score | Final Result | |
|---|---|---|---|---|---|---|
| | | ACK/NACK | α | | Total Score | ACK/NACK |
| Own ACK/NACK | | 11111111 | 1.0 | 10 | 10 | ACK |
| Other ACK/NACK | Process #N-1 | 11 | 0 | 0 | | |
| | Process #N-2 | 11 | 0 | 0 | | |
| | Process #N-3 | 10 | 0 | 0 | | |
| | Process #N-4 | 00 | 0 | 0 | | |
| | Process #N-5 | 11 | 0 | 0 | | |

FIG. 12

| | Input Signal ACK/NACK | Weight α | Score | Final Result Total Score | Final Result ACK/NACK |
|---|---|---|---|---|---|
| Own ACK/NACK | 1111111111 | 1.0 | 10 | 12 | ACK |
| Other ACK/NACK Process #N-1 | 11 | 0.5 | 1 | | |
| Other ACK/NACK Process #N-2 | 11 | 0.5 | 1 | | |
| Other ACK/NACK Process #N-3 | 10 | 0.5 | 0 | | |
| Other ACK/NACK Process #N-4 | 00 | 0.5 | -1 | | |
| Other ACK/NACK Process #N-5 | 11 | 0.5 | 1 | | |

FIG. 13

| Input Signal | | Weight | Score | Final Result | |
|---|---|---|---|---|---|
| ACK/NACK | | $\alpha$ | | Total Score | ACK/NACK |
| Own ACK/NACK | NOT RECEIVED | 1.0 | 0 | 2 | ACK |
| Other ACK/NACK Process #N-1 | 11 | 0.5 | 1 | | |
| Process #N-2 | 11 | 0.5 | 1 | | |
| Process #N-3 | 10 | 0.5 | 0 | | |
| Process #N-4 | 00 | 0.5 | −1 | | |
| Process #N-5 | 11 | 0.5 | 1 | | |

FIG. 14

| | | Input Signal | Weight | Score | Final Result | |
|---|---|---|---|---|---|---|
| | | ACK/NACK | α | | Total Score | ACK/NACK |
| Own ACK/NACK | | 1100111100 | 1.0 | 2 | 5 | ACK |
| Other ACK/NACK | Process #N-1 | 11 | 0.5 | 1 | | |
| | Process #N-2 | 11 | 1.0 | 2 | | |
| | Process #N-3 | 10 | 0.5 | 0 | | |
| | Process #N-4 | 00 | 0.5 | −1 | | |
| | Process #N-5 | 11 | 0.5 | 1 | | |

FIG. 15

| Own ACK/NACK | | Input Signal ACK/NACK | Weight α | Score | Weight α' | Score | Final Result | |
|---|---|---|---|---|---|---|---|---|
| | | | | | | | Total Score | ACK/NACK |
| | Process #N-1 | 1111110000 | 1.0 | 2 | 1.0 | 2 | 1 | ACK |
| Other ACK/NACK | Process #N-2 | 00 | | | | | | |
| | Process #N-3 | 00 | 1.0 | -2 | 0.5 | -1 | | |
| | Process #N-4 | 11 | | | | | | |
| | Process #N-5 | 11 | | | | | | |

FIG. 16

| SIR FLUCTUATION | RECEIVING TIMING SIR VALUE | OWN PROCESS DEVIATION | SERVICE KIND | FIRST WEIGHT COEFFICIENT |
|---|---|---|---|---|
| STABLE | HIGH | LARGE | RT | 1.0 |
| | | | NRT | 1.0 |
| | | SMALL | RT | 0.5 |
| | | | NRT | 0.5 |
| | LOW | LARGE | RT | 0.7 |
| | | | NRT | 0.7 |
| | | SMALL | RT | 0.5 |
| | | | NRT | 0.5 |
| FLUCTUATING | HIGH | LARGE | RT | 1.0 |
| | | | NRT | 1.0 |
| | | SMALL | RT | 0.3 |
| | | | NRT | 0.5 |
| | LOW | LARGE | RT | 0.5 |
| | | | NRT | 0.7 |
| | | SMALL | RT | 0.3 |
| | | | NRT | 0.5 |

FIG. 17

| SIR FLUCTUATION | RECEIVING TIMING SIR VALUE | OWN PROCESS DEVIATION | SERVICE KIND | FIRST WEIGHT COEFFICIENT |
|---|---|---|---|---|
| STABLE | HIGH | LARGE | RT | 1.0 |
| | | | NRT | 1.0 |
| | | SMALL | RT | 0.3 |
| | | | NRT | 0.3 |
| | LOW | LARGE | RT | 0.5 |
| | | | NRT | 0.5 |
| | | SMALL | RT | 0.3 |
| | | | NRT | 0.3 |
| FLUCTUATING | HIGH | LARGE | RT | 1.0 |
| | | | NRT | 1.0 |
| | | SMALL | RT | 0.3 |
| | | | NRT | 0.5 |
| | LOW | LARGE | RT | 0.5 |
| | | | NRT | 0.7 |
| | | SMALL | RT | 0 |
| | | | NRT | 0 |

FIG. 20

| Information Element/Group name | Need | Multi | Type and reference | Semantics description | Version |
|---|---|---|---|---|---|
| MAC-hs queue to add or reconfigure list | OP | <1 to maxQueue ID> | | | REL-5 |
| >MAC-hs queue Id | MP | | Integer(0..7) | The MAC-hs queue ID is unique across all MAC-d flows. | REL-5 |
| >MAC-d Flow Identity | MP | | MAC-d Flow Identity 10.3.5.7c | | REL-5 |
| >T1 | MP | | Integer(10, 20, 30, 40, 50, 60, 70, 80, 90, 100, 120, 140, 160, 200, 300, 400) | Timer (in milliseconds) when PDUs are released to the upper layers even though there are outstanding PDUs with lower TSN values. | REL-5 |
| >MAC-hs window size | MP | | Integer(4, 6, 8, 12, 16, 24, 32) | | REL-5 |
| >MAC-d PDU size Info | OP | <1 to max MACdPDU sizes> | | Mapping of the different MAC-d PDU sizes configured for the HS-DSCH to the MAC-d PDU size index in the MAC-hs header. | REL-5 |
| >>MAC-d PDU size | MP | | Integer (1..5000) | | REL-5 |
| >>MAC-d PDU size index | MP | | Integer(0..7) | | REL-5 |
| MAC-hs queue to delete list | OP | <1 to maxQueue ID> | | | REL-5 |
| >MAC-hs queue Id | MP | | Integer(0..7) | The MAC-hs queue ID is unique across all MAC-d flows. | REL-5 |

FIG. 22

| Slot Format #i | Channel Bit Rate (kbps) | Channel Symbol Rate (ksps) | SF | Bits/Subframe | Bits/Slot | Transmitted slots per Subframe |
|---|---|---|---|---|---|---|
| 0 | 15 | 15 | 256 | 30 | 10 | 3 |

FIG. 23

| RECEIPT CONFIRMATION DATA | | ACTION CAUSED BY MISJUDGMENT | REMARKS |
|---|---|---|---|
| MOBILE STATION SIDE | BASE STATION SIDE | | |
| ACK | NACK | RETRANSMITTING | (1) JUDGE THAT SIGNAL HAS NOT BEEN CORRECTLY RECEIVED AND RETRANSMIT THE SIGNAL |
| ACK | DTX | NEWLY TRANSMITTING AGAIN | (2) JUDGE THAT MOBILE STATION FAIL TO CONFIRM TRANSMISSION AND NEWLY TRANSMIT THE SAME DATA |
| NACK | ACK | NEVER RETRANSMITTING | (3) JUDGE THAT MOBILE STATION CORRECTLY RECEIVE SIGNAL AND NEWLY TRANSMIT NEXT DATA |
| NACK | DTX | NEWLY TRANSMITTING AGAIN | (4) JUDGE THAT MOBILE STATION FAIL TO CONFIRM TRANSMISSION AND NEWLY TRANSMIT THE SAME DATA DURING IR COMBINING ACTION, SIGNAL IS TRANSMITTED WITHOUT CHANGING RV, SO THAT GAIN CAUSED BY IR COMBINATION CANNOT BE OBTAINED (CHASE COMBINATION) |

ACK: 1111111111
NACK: 0000000000
PREAMBLE ("PRE"): 0010010010
POSTAMBLE ("POST"): 0100100100

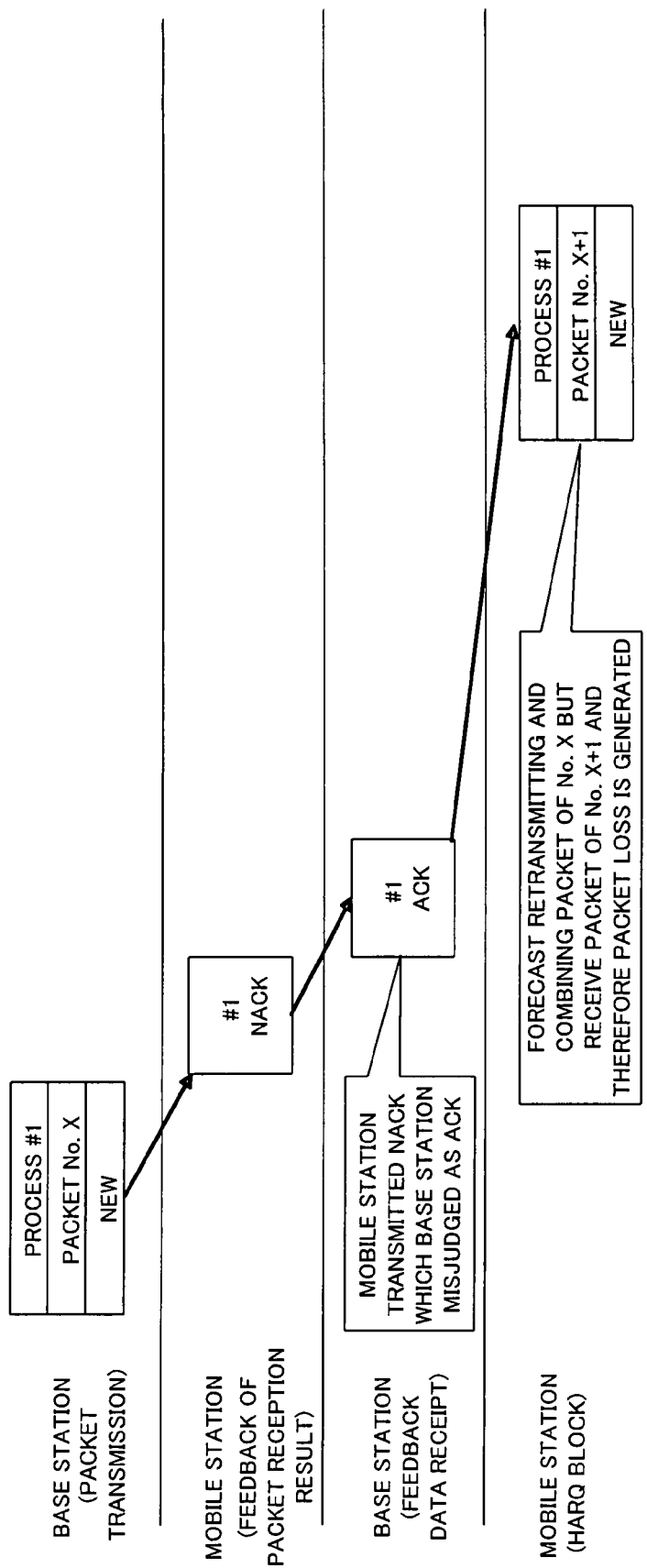

METHOD AND APPARATUS FOR RADIO COMMUNICATION

CROSS REFERENCE TO RELATED APPLICATIONS

This application is based on and hereby claims priority to Japanese Application No. 2006-322367 filed on Nov. 29, 2006 in Japan, the contents of which are hereby incorporated by reference.

BACKGROUND OF THE INVENTION

1. Field of the Invention

The present invention relates to a method and apparatuses for radio communication preferably used in a communication system which employs the HSDPA (High Speed Downlink Packet Access) method, one of mobile communication systems.

2. Description of the Related Art

In the present 3GPP (3rd Generation Partnership Project), W-CDMA (Wideband-Code Division Multiple Access) method, one of the third-generation mobile communication systems, is being standardized. One of the standardization objects is to define HSDPA which provides a downlink transmission speed of 14 Mbps at maximum.

HSDPA adopts an adaptive coding and modulation method, in which communication between a base station and a mobile station is switched between, for example, QPSK (Quadrature Phase Shift Keying) modulation method and 16QAM (Quadrature Amplitude Modulation) method according to a radio environment between these stations.

Further, HSDPA employs an HARQ (Hybrid Automatic Repeat reQuest) method which is characterized by that, if a mobile station detects an error in received data from a base station, the base station retransmits the same data responsive to a request from the mobile station and the mobile station performs an error correction decoding process using both received data and the retransmitted data. In HSDPA, efficient use of received data even with an error in the above manner makes it possible to enhance the gain of error correction and thereby reduce the number of retransmission processes.

HSDPA mainly uses radio channels of HS-SCCH (High Speed-Shared Control Channel), HS-DSCH (High Speed-Downlink Shared Channel), and HS-DPCCH (High Speed-Dedicated Physical Control Channel).

HS-SCCH and HS-DSCH are common downlink channels (i.e., in the direction from a base station to a mobile station). HS-SCCH is a control channel to transmit various parameters (L1 information) concerning data transmitted through HS-DSCH. The parameters are exemplified by modulation type information indicating that data is transmitted through HS-DSCH in which modulation method, the number of spreading codes to be allocated (a code multiplication number), a process number of HS-DSCH, a retransmission/new indicator whether or not transmission data is retransmission data or new data, and a pattern used for rate matching to be performed on transmission data.

HS-SCCH is capable of concurrently transmitting a control signal to a number of mobile stations using a number (e.g., four) of spreading codes, and each of the mobile stations specifies HS-SCCH destined for the own mobile station with reference to UE-ID (User Equipment-IDentity).

HS-DPCCH is a dedicated control channel to uplink communication from an individual mobile station to a base station, and is specifically used to transmit an ACK signal (ACK information) and a NACK signal (NACK information), respectively indicating successfully reception and failure reception of data through HS-DSCH, from the mobile station to the base station. In the event of failure in data reception, if the data received is a CRC (Cyclic Redundancy Check) error, the mobile station transmits a NACK signal to the base station, which performs retransmission control.

Additionally, HS-DPCCH is used to send a base station a CQI (Channel Quality Indicator) that is a measurement result (e.g., SIR (Signal to Interference Ratio)) of receipt quality of a signal from the base station when measurement is performed by a mobile station. The base station judges, according to the CQI, whether or not the downlink radio environment is good, and switches a modulation method to a method able to transmit data in a higher speed if the judgment result is positive and conversely switches to a method to transmit data in a lower speed if the judgment result is negative (in other words, performs an adaptive modulation). Here, a frame format for HS-DPCCH is shown in FIG. 21 and a field for HS-DPCCH is shown in FIG. 22.

As described above, in a system employing HSDPA, data transmission between a base station and a mobile station is confirmed, and if a loss of a PDU (Packet Data Unit) or a transmission-and-reception error is detected, the system carries out FEC (Forward Error Correction) and ARQ (Automatic Repeat reQuest).

Further, in order to enhance the communication efficiency by efficient operation of HARQ, there has been proposed an N-channel Stop and Wait method in which N (an integer of two or more) HARQ processes are provided in a radio communication between a base station and mobile stations. In this method, before reception confirmation information (ACK/NACK information) concerning a certain transmission process reaches either station (the mobile or base station) from the opposite station (the base or the mobile station), the first station can transmit a PDU for the next process to the opposite station.

For example, in an N-channel stop-and-wait method where N=6, when a PDU with process number "1" is transmitted from the base station to a mobile station, the base station sequentially transmits PDUs for six processes at maximum in advance before ACK/NACK information for the PDU of process number "1" from the mobile station reaches the base station. That improves communication efficiency in a radio communication system even large in response delay. In HARQ employing the N-channel stop-and-wait method, a number (N) of processes are independent one after another and reception confirmation information (ACK/NACK information) concerning each process is associated with the individual process and transmitted to the opposite station.

However, data pieces concerning one or more of a number of processes do not correctly reach the opposite station for various reasons such as deterioration in communication state. As a result, if a result of recognition of ACK/NACK information at the transmitter side (the mobile station) does not coincide with that at the receiver side (the base station), an abnormal operation exemplified by the below (1) to (4) occurs. FIG. 23 is a diagram showing examples of a transmission operation performed in the base station when the base station has misrecognized ACK/NACK information from the mobile station.

(1) If the base station misrecognized ACK information from the mobile station to be NACK information, the base station judges that the mobile station (the opposite station) has not correctly received the data and retransmits the same data to the mobile station (a retransmission process).

(2) If the base station misrecognized ACK information from the mobile station to be DTX (not reached), the base station judges that the mobile station does not recognize the transmission of the data to the mobile station and transmits the same data as new data.

(3) If the base station misrecognized NACK information from the mobile station to be ACK information, the base station judges that the base station has normally received the data and transmits next new data.

(4) If the base station misrecognized NACK information from the mobile station to be DTX information, the base station judges that the mobile station does not recognize the transmission of the data the mobile station and transmits the same data as new data. In this case, if IR (Incremental Redundancy) combination is activated, again of IR combination cannot be obtained because the base station transmits the data without changing the RV (Redundancy Version) (Chase combination).

As described above, if the base station misrecognizes ACK/NACK information, the base station does not retransmit data which should be retransmitted or unnecessarily retransmits data that has been normally received by the mobile station.

As a solution to the above problem, Non-Patent Reference 1 discloses that previously-known training patterns called Preamble and Postamble (hereinafter called PRE and POST, respectively) are attached to ACK/NACK information so as to sandwich the ACK/NACK information as shown in FIG. 24, so that adjustment of a detection threshold value by such training patterns can improve accuracy of detection of ACK/NACK information at the receiver side, avoiding an increase in the transmission electricity power.

Further, the following Patent Reference 1 discloses the technique that soft-decision combination values of all the symbols of ACK/NACK information are combined and ACK/NACK information is judged on the basis of a comparison of the combination result and the predetermined threshold value.

The following Non-Patent Reference 2 describes an allowable error rate on a radio propagation path between a mobile station and a base station.

[Patent Reference 1] Japanese Patent Application Laid-Open (KOKAI) No. 2005-51713

[Non-Patent Reference 1] TR25.899V6.1.0 (September 2004) (6.7 ACK/NACK Transmit Power Reduction for HS-DPCCH with preamble and postamble)

[Non-Patent Reference 2] TS25.104V7.4.0 (June 2006) (8.10 Performance of ACK/NACK detection for HS-DPCCH)

The above-described art disclose contrivances to reduce the possibility of misrecognition occurrence on ACK/NACK information.

However, considering the case where the control channel (HS-DPCCH) through which the above receipt confirmation information (ACK/NACK information) is transmitted is not demodulated in the receiver station (i.e., the base station), these techniques cannot ensure normal (sure) transmission of ACK/NACK information.

In particular, an allowable error rate of a radio propagation path between a mobile station and a base station in a predetermined environment is defined to be less than the specification condition $10^{-2}$ (see above Non-Patent Reference 2). This allowable error rate is for a long period and is therefore excessively large for an instant error rate in communication on the high-speed movement or in a multi-path fading environment, resulting in tendency of occurring an error.

As understood from the above description, since misrecognition of ACK/NACK information is unneglectable, the problem is that normal data communication (retransmission) is not carried out for a process ACK/NACK information of which has been misrecognized.

Here, description will be made in relation to data (packet) communication (a retransmission process) performed when ACK/NACK information has been misrecognized with reference to accompanying drawing FIG. 25, which is a flow diagram explaining data communication in the above case (3), for example.

In a communication system employing an N-channel stop-and-wait method, the base station transmits new data (a packet) having process number "1" (Process #1) and packet number "X" (Packet No. X) to the mobile station (packet transmission). If the mobile station cannot normally receive the data piece in question, the mobile station transmits NACK information to the base station (feedback of the reception result of the packet).

The base station receives the reception confirmation result (the feedback information) from the mobile station and, if however misrecognizes the NACK information to be ACK information due to an error occurring at the radio propagation path, transmits new data having process number "1" (Process #1) and packet number "X+1" (Packet No. X+1) when performing a transmission process of the next process umber "1" (HARQ block).

The mobile station plans to perform a combination of retransmission process on the data of process number "1" and packet number "X", but cannot carry out the planed process because the new data received from the base station has process number "1" and packet number "X+1". Further, the base station does not retransmit data of process number "1" and packet number "X" to the mobile station, the data (packet) is lost.

As described above, if the base station misrecognizes ACK/NACK information from the mobile station, normal operation for data communication cannot be performed. As another example, if the base station misjudged an ACK response to be NACK or DTX, the base station should transmit a new data but actually carries out a retransmission process whereby the communication rate is lowered.

As described above, the process ACK/NACK information of which is misrecognized is temporarily deadlocked until the next reception confirmation information (i.e., ACK/NACK information) of the same process is correctly received by the base station.

Accordingly, in an HARQ process performed in N-channel stop-and-wait method where N=6, deadlocking of one process lowers communication rate (throughput) by as high as 17 percent (one sixth).

SUMMARY OF THE INVENTION

The object of the present invention is to reduce the possibility of misrecognition occurrence on ACK/NACK information.

To attain the above object, the present invention is provided by using the radio communication method and the radio communication apparatuses described below.

(1) As a first generic feature, there is provided a radio communication method in a radio communication system including a first radio communication apparatus which transmits signals according to cyclic process numbers and a second radio communication apparatus which receives the signals, the method comprising the steps of: in the second radio communication apparatus, generating a first information element indicating a reception result for a received signal of a process number, and a second information element indicating a reception result for another received signal of another process number; transmitting response signals in response to the individual received signals, each of the response signals including the first and second information elements, to the first radio communication apparatus; and in the first radio communication apparatus, judging a reception result of the transmitted signal of a process number in accordance with the first information element of the response signal corresponding to the process number and the second information element of another response signal corresponding to the process number.

(2) As a preferable feature, the second radio communication apparatus may add two or more of the second information elements indicating reception results for received signals of process numbers other than the process number to the first information element.

(3) As another preferable feature, the second radio communication apparatus may change the number of second information elements that are to be added to the first information element according to a radio communication environment between the first radio communication apparatus and the second radio communication apparatus.

(4) As an additional preferable feature, the second radio communication apparatus may further add a predetermined training pattern information element, in addition to the one or more second information elements, to the first information element.

(5) As a further preferable feature, the first radio communication apparatus may make a weighting combination among the second information elements.

(6) As a still further preferable feature, the first radio communication apparatus may make a weighting combination among the first and second information elements; and may judge the reception result in accordance with the result of the weighting combination.

(7) As a second generic feature, there is provided a radio communication apparatus, for a radio communication system, receives signals transmitted according to cyclic process numbers from a radio communication entity of the system, the radio communication apparatus comprising: a first generating means for generating a first information element indicating a reception result for a received signal of a process number; a second generating means for generating a second information element indicating a reception result for another received signal of another process number; and a transmitting means for transmitting response signals in response to the individual received signals, each of the response signals including the first and second information elements, to the radio communication entity.

(8) As a preferable feature, the transmitting means may include multiplexing transmission section for adding two or more of the second information elements indicating reception results for received signals of process numbers other than the process number to the first information element and transmitting response signals including the first and second information elements.

(9) As a third generic feature, there is provided a radio communication apparatus, for a radio communication system, transmits signals according to cyclic process numbers to a radio communication entity of the system, the radio communication apparatus comprising: receiving means for receiving response signals respectively including a first information element indicating a reception result for a transmitted signal of a process number and a second information element indicating a reception result for another transmitted signal of another process number from the radio communication entity; and judging means for judging a reception result of the transmitted signal of the process number in accordance with the first information element of the response signal corresponding to the process number and the second information element of another response signal corresponding to the process number.

(10) As a preferable feature, the judging means may make a weighting combination among the first and second information elements; and may judge the reception result in accordance with the result of the weighting combination.

The present invention with the above features guarantees the following results and advantages.

(1) The second radio communication apparatus generates a first information element indicating a reception result for a received signal of a process number, and a second information element indicating a reception result for another received signal of another process number and transmits response signals in response to the individual received signals, each of the response signals including the first and second information elements, to the first radio communication apparatus. The first radio communication apparatus judges a reception result of the transmitted signal of a process number in accordance with the first information element of the response signal corresponding to the process number and the second information element of another response signal corresponding to the process number. With these feature, increase in redundancy of information elements indicating a reception result can improve the error concealment and can thereby reduce the possibility of misrecognition occurrence of ACK/NACK information at the receiver side as compared with the case where one information element for a reception result of each process number is transmitted. As a result, it is possible to inhibit occurrence of dead lock and to improve the throughput of communication between the first and the second radio communication apparatus.

(2) Judgment performed on the first and the second information elements among which a weighting combination has been made makes it possible to perform reception result judgment, flexibility compensating the change in reception stateby, for example, providing a larger weight for a reception result of a process communicated in a fine reception state (radio communication environment).

Other objects and further features of the present invention will be apparent from the following detailed description when read in conjunction with the accompanying drawings.

BRIEF DESCRIPTION OF THE DRAWINGS

FIG. 5 is a diagram illustrating an example of a frame format for each process according to the first embodiment of the present invention;

FIG. 6 is a diagram illustrating another example of a frame format for each process according to the first embodiment of the present invention;

FIG. 7 is a diagram illustrating still another example of a frame format for each process according to the first embodiment of the present invention;

FIG. 11 is a diagram illustrating an example of a weighting pattern according to a modification of the present invention;

FIG. 12 is a diagram illustrating another example of a weighting pattern according to a modification of the present invention;

FIG. 13 is a diagram illustrating still another example of a weighting pattern according to a modification of the present invention;

FIG. 14 is a diagram illustrating an additional example of a weighting pattern according to a modification of the present invention;

FIG. 15 is a diagram illustrating a further example of a weighting pattern according to a modification of the present invention;

FIG. 16 is a diagram illustrating an example of a weight setting manner according to a modification of the present invention;

FIG. 17 is a diagram illustrating another example of a weight setting manner according to a modification of the present invention;

FIG. 20 is a diagram illustrating a T1 timer;

FIG. 22 is a diagram schematically illustrating a field of HS-DPCCH;

FIG. 23 is a diagram illustrating an example of a transmission operation performed by a transmission source communication apparatus;

FIG. 25 is a diagram schematically illustrating an example of an operation performed in a conventional radio communication system.

DESCRIPTION OF THE PREFERRED EMBODIMENTS

A preferred embodiment and a modification of the present invention will now be described with reference to the accompanying drawings.

(A) First Embodiment

Figure 1:
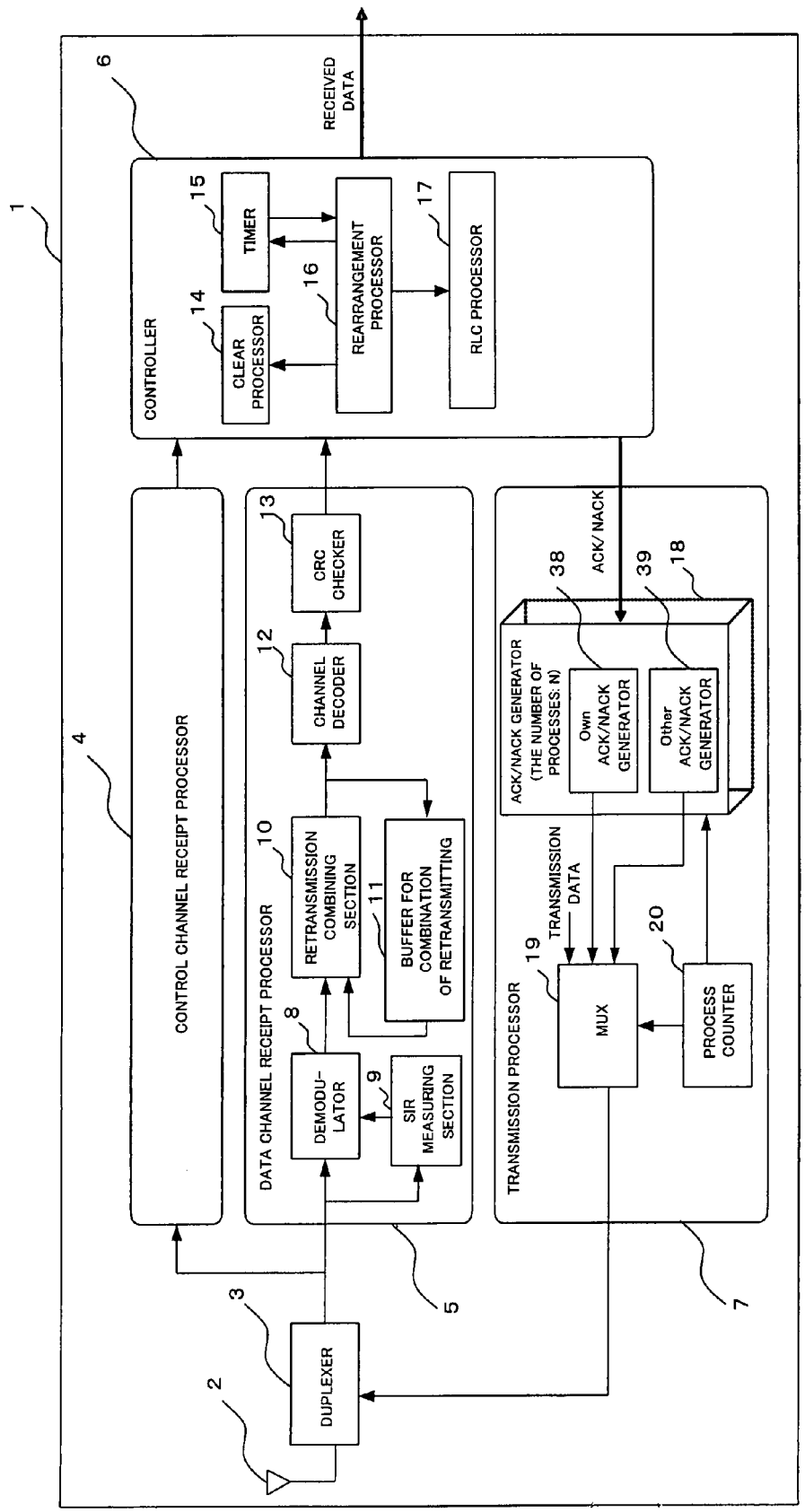
FIG. 1 is a block diagram schematically illustrating a radio communication apparatus (a mobile station, a transmission destination communication apparatus, a second communication apparatus) according to a first embodiment of the present invention.
Figure 2:
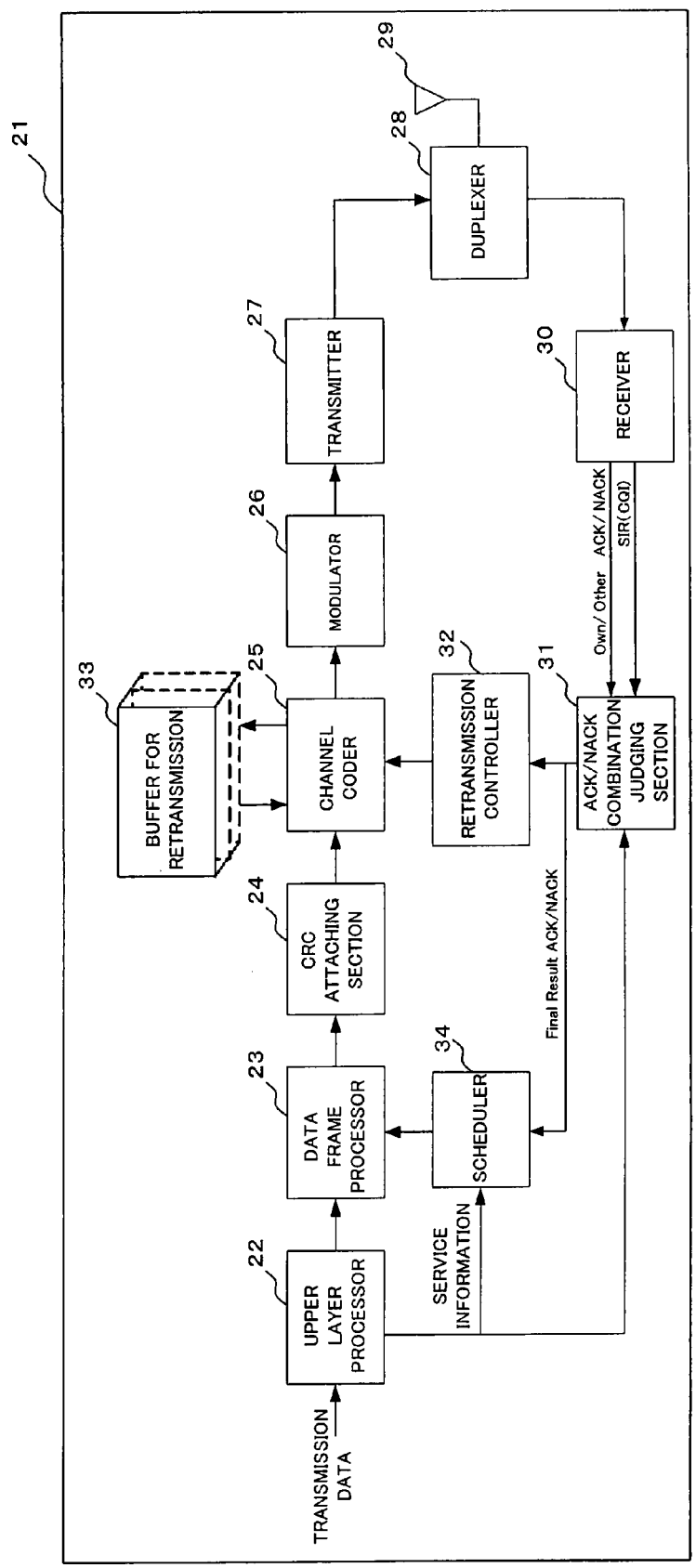
FIG. 2 is a block diagram schematically illustrating a radio communication apparatus (a base station, a transmission source communication apparatus, a second communication apparatus) according to the first embodiment of the present invention.

FIGS. 1 and 2 are block diagrams schematically illustrating the main parts of radio communication apparatuses according to the first embodiment of the present invention. Apparatus 1 shown in FIG. 1 is, for example, a mobile station that is one of the components of a radio communication system; and apparatus 21 is a base station in the system. Hereinafter, focusing on data (packet) communication from base station 21 to mobile station 1, base station 21 corresponds to a transmission source communication apparatus of packets and mobile station 1 corresponds to a transmission destination communication apparatus of the packets.

(Description of Mobile Station 1)

Mobile station 1 shown in FIG. 1 is a radio communication apparatus that performs data transmission-and-receiving processes according to process numbers (cyclic process numbers) defined for specifying signals (data pieces) that are to be subjected to combination of retransmission (signals being objects for HARQ combining). Mobile station 1 in this example includes antenna 2, duplexer 3, control channel receipt processor 4, data channel receipt processor 5, controller 6, and transmission processor 7.

Here, antenna 2 receives downlink signals transmitted from base station 21 and transmits uplink signals to the destination base station 21.

Duplexer 3 sends signals received at antenna 2 to control channel receipt processor 4 and data channel receipt processor 5, and sends signals from transmission processor 7 to antenna 2.

Control channel receipt processor 4 has a function for demodulating and decoding the control channel (e.g., HS-SCCH of HSDPA) of downlink signals received through antenna 2.

Data channel receipt processor 5 has a function for demodulating and decoding the data channels of downlink signals (e.g., HS-PDSCH (High Speed-Physical Downlink Shared Channel) of HSDPA) received through antenna 2, and includes demodulator 8, SIR measuring section 9, retransmission combining section 10, memory buffer 11 for combination of retransmission, channel decoder 12, and CRC checker 13 to realize the function in the illustrated example.

Demodulator 8 demodulates the data channels of downlink signals received through antenna 2 in a demodulation method conforming to the modulation method (e.g., QPSK or 16QAM) used in base station 21, and specifically demodulates bit data for each data channel which bit data is from duplexer 3 to symbol data and input the demodulated symbol data of each data channel to the retransmission combining section 10. If an adaptive coding and modulation method such as HSDPA is employed, information about the modulation method can be notified through the control channel (HS-SCCH).

SIR measuring section 9 measures an SIR, which represents receipt quality information of a downlink signal transmitted from base station 21. Controller 6 generates, according to the value of an SIR measured by SIR measuring section 9, a CQI, and feedbacks the CQI to base station 21 through the control channel.

Retransmission combining section 10 combines retransmission (HARQ combines) data from demodulator 8 and data which has been stored in memory buffer 11 (for combination of retransmission) and which is the same in the process number as the former data if the former data is data retransmitted. Memory buffer 11 (for combination of retransmission) retains (contain) data from demodulator 8 for future possible combination of retransmission of data.

Channel decoder 12 performs a channel decoding process (e.g., an error correction decoding process) conforming to the coding method and the coding rate at base station 21 on data from retransmission combining section 10. For example, if base station 21 uses an adaptive coding and modulation method such as HSDPA, information about the modulation method is also notified through the control channel (HS-SCCH).

CRC checker 13 performs a CRC check process (CRC operation) on data from channel decoder 12. If the result of CRC process is normal (OK), ACK information is transmitted to base station 21, and if the result is abnormal (NG), NACK information is transmitted to 21 as a feedback.

Controller 6 has supervisory control over the processes performed in mobile station 1, and includes clear processor 14, timer 15, rearrangement processor 16, and RLC processor 17 in the illustrated example as shown in FIG. 1. The functions of these elements are realized by processors such as a CPU (Central Processing Unit) and a DSP (Digital Signal Processor), a requisite memory and others, which are however not shown in the drawing.

Rearrangement processor 16 rearranges a number of data pieces (PDUs) received in a certain order from data channel receipt processor 5 to assemble the data pieces into data in a predetermined format. Specifically, rearrangement processor 16 temporarily stores each received PDU in a non-illustrated buffer (memory), rearranges a number of PDUs same in process number in an order fitting the predetermined format, and then transmits rearranged data to a non-illustrated upper layer so that PDUs in the predetermined format can be assembled. In addition, during rearrangement of a number of PDUs of a certain process number, rearrangement processor 16 stores PDUs having different process numbers from the certain process number which PDUs have been issued from base station 21 into the buffer (memory) (i.e., making the PDUs stand-by state).

RLC processor 17 makes an ACK/NACK judgment on the basis of the result of CRC check by CRC checker 13, and transmits ACK information if the result is normal (OK) and NACK information if the result is abnormal (NG) to transmission processor 7. In addition, RLC processor 17 generates a CQI based on an SIR value measured by SIR measuring section 9 and sends the generated CQI to transmission processor 7.

Timer 15 determines the upper limit of time which is taken by rearrangement processor 16 to carry out the rearrangement and controls the rearrangement. In other words, if the maximum waiting time (WT) determined in timer 15 has passed, rearrangement processor 16 aborts the rearrangement and transmits received data to upper layer.

Clear processor 14 clears the buffer region each predetermined time period WT.

Transmission processor 7 carries out a transmission process of uplink signals destined for base station 21 which process is exemplified by generation of a data transmission frame by combining ACK/NACK information of a received data piece and transmission data destined for base station 21. For this purpose, transmission processor 7 here includes ACK/NACK generator 18, multiplexer (MUX) 19, and process counter 20 as shown in FIG. 1.

ACK/NACK generator 18 generates, for each individual process number assigned by process counter 20, two kinds of ACK/NACK information concerning a received data piece of the individual process number that is to be processed on the basis of the result of ACK/NACK judgment in controller 6. The two kinds of ACK/NACK data are Own ACK/NACK information element (first information element) that is fundamental ACK/NACK information indicating a reception result of a received data piece of a certain process number and Other ACK/NACK data (second information element) indicating the receipt result of the same data piece of the certain process number that is additive ACK/NACK information to be added to Own ACK/NACK information element indicating a reception result of a received data piece of another process number.

Figure 24:
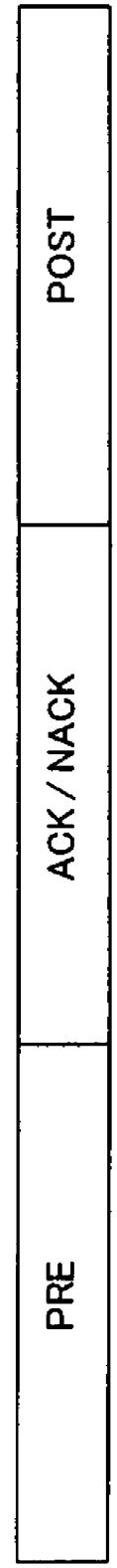
FIG. 24 is a diagram illustrating an example of a frame format of conventional ACK/NACK information.

ACK/NACK generator 18, optionally, generates predetermined training pattern information (e.g., PRE and POST described above with reference to FIG. 24) as well as such ACK/NACK information and adds the training pattern data to the ACK/NACK information.

For this purpose, ACK/NACK generator 18 of the present invention includes, as shown in FIG. 1, at least Own ACK/NACK generator (first generating means) 38 for generating Own ACK/NACK information elements and other ACK/NACK generator (second generating means) 39 for generating Other ACK/NACK information elements. The data amount (the number of bits) of Own ACK/NACK information element and that of Other ACK/NACK information element may be adaptively modified (controlled) according to a parameter concerning a radio communication environment. The parameter is exemplified by an SIR value measured by SIR measuring section 9. Alternatively, the function for the modification may be realized by, for example, controller 6.

MUX (multiplexer) 19 multiplexes transmission data destined for base station 21, Own ACK/NACK information element and Other ACK/NACK information element from ACK/NACK generator 18, and the above training pattern information under process control by process counter 20 so that the data generated by the multiplication conforms to a predetermined frame format (for example, shown in FIG. 3 or 4) and sends the generated data to duplexer 3.

Process counter 20 counts the process number in increments of one and notifies the counts to MUX 19 and ACK/NACK generator 18 in order to manage and control generation and multiplication of ACK/NACK information and the training pattern information for each individual process number.

Specifically, transmission processor 7 of the first embodiment includes ACK/NACK generator 18 (38 and 39), MUX 19 and process counter 20, which make transmission processor 7 possible to function as transmitting means that transmits response signals, each of which is generated by adding Other ACK/NACK information element (second information element) for another process number to Own ACK/NACK information element (first information element) for a certain process number, to base station 21 that is the transmission source of the received (data) signals.

Further, MUX 19 of the first embodiment functions as a multiplexing transmitter that adds Other ACK/NACK information elements (second information elements) indicating reception results of a number of a number of received data pieces different in process number from Own ACK/NACK information element to the Own ACK/NACK information element (first information element) and transmits the data generated by the addition to base station 21 that is the transmission source of the received signals (data pieces).

(Description of Operation Performed in Mobile Station 1)

Hereinafter, brief description is made in relation to the entire operation performed in mobile station 1. First of all, antenna 2 receives downlink signals from base station 21. The control channel of the (received) signals is demodulated and decoded in control channels receipt processor 4 and the data channels of the (received) signals demodulated and decoded in data channel receipt processor 5, which carries out a retransmission combining process on the signals demodulated and decoded as required. In succession, if the result of a predetermined data processing, such as CRC check performed on the received signal of a certain process number is OK, controller 6 makes an ACK judgment; conversely, if the result of the CRC check on the same received signal is negative (NG), controller 6 makes a NACK judgment.

Then, on the basis of the result of ACK/NACK judgment made by controller 6, transmission processor 7 generates, for each individual process number designated by process counter 20, fundamental ACK/NACK information element (Own ACK/NACK information element) to a received data piece of a certain process number which element indicates a reception result of the same received data piece and additive ACK/NACK information element (Other ACK/NACK information element) concerning a reception result of the same received data piece which element is to be added to Own ACK/NACK information element for a received data piece of another process number other than the certain process number. In addition, transmission processor 7 combines these ACK/NACK information elements and transmission data destined for base station 21 and transmits the combined data to base station 21.

(Description of a Frame Format of Feedback Information to Base Station 21)

Figure 3:
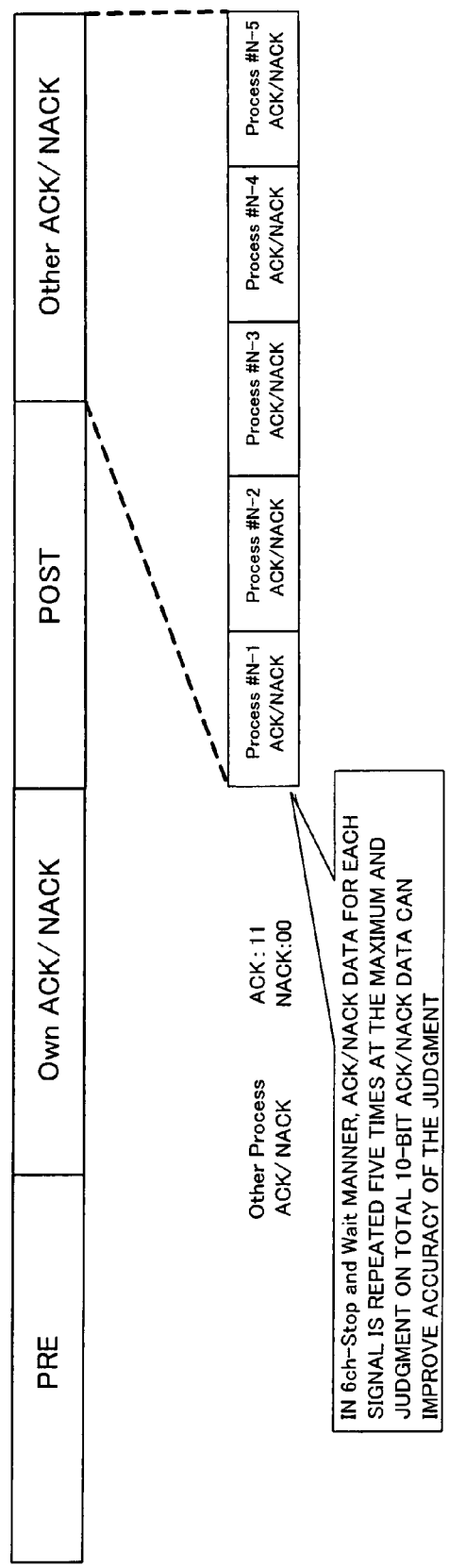
FIG. 3 is a diagram schematically illustrating an example of a frame format according to the first embodiment of the present invention.
Figure 4:
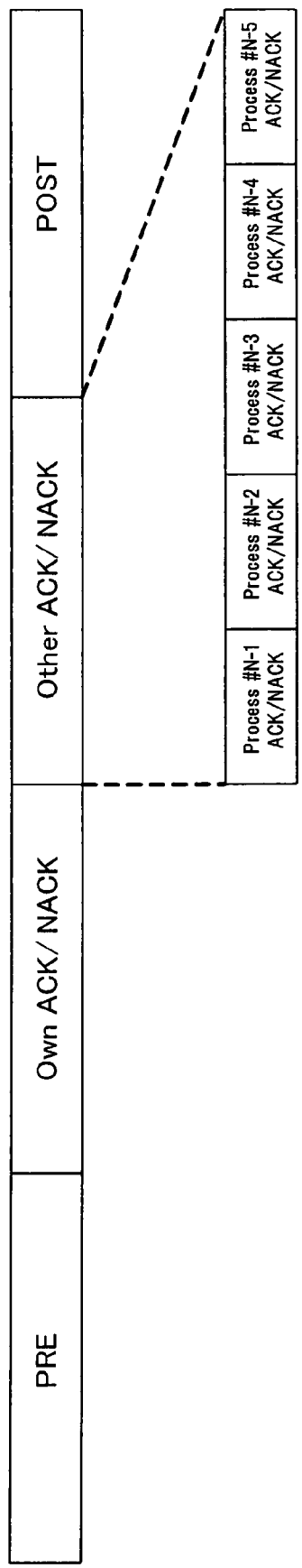
FIG. 4 is a diagram schematically illustrating another example of a frame format according to the first embodiment of the present invention.

Explanation is to be made in relation to a frame format of feedback information which is generated in mobile station 1 and which is destined for base station 21 with reference to FIGS. 3 and 4, each of which schematically shows an example of a frame format of data output form MUX 19.

The frame format in FIG. 3 has the forward part in which training patterns (PRE and POST) sandwich Own ACK/NACK information element and the backward part containing Other ACK/NACK information elements adaptive to the forward part. The frame format of FIG. 3 represents the case of a stop-and-wait manner of N=6 and more specifically represents a frame format in which Own ACK/NACK information element indicating a reception result of a received data piece of process number "6" and Other ACK/NACK information elements indicating reception results of received data pieces of process numbers "N−1", "N−2", "N−3", "N−4", and "N−5"="5", "4", "3", "2", and "1" are multiplexed. Here, an Other ACK/NACK information element which is to be multiplexed and which is ACK/NACK information indicating a reception result of each of received data pieces of the process numbers from "1" to "5" takes the form of a 2-bit ACK information element (here, "11") or a 2-bit NACK information element (here, "00").

In the stop-and-wait manner of N=6, data for a received data piece of each process number is in a frame format containing a fundamental ACK/NACK information element (i.e., Own ACK/NACK information element) for a certain process number and five 2-bit ACK/NACK information elements, which totals 10 bits and each of which indicates a reception result of one of the received data pieces of other five process numbers. As described below with reference to FIGS. 5 and 6, in transmission of a frame format concerning 6 processes, the reception result of a received data piece of each process number is transmitted in a 2-bit ACK/NACK information element (i.e., Other ACK/NACK information element) which is adaptive to Own ACK/NACK information elements concerning the other five process numbers and which is distributed by repetitiously transmission, in addition to in the fundamental Own ACK/NACK information element.

Accordingly, receipt of data in the above frame format for 6 processes makes base station 21 possible to make an ACK/NACK judgment for each process number in consideration of Other ACK/NACK information elements (2 bits for each of the five remaining process, total 10 bits) in addition to Own ACK/NACK information element, resulting in enhancing error concealment of ACK/NACK information and therefore reducing the occurrence rate of misjudgment as compared with judgment based only on Own ACK/NACK information element.

The mapping (multiplexing) order in the frame format, that is the order of training pattern information, Own ACK/NACK information element, and Other ACK/NACK information elements may be properly modified. For example, it is possible to make the frame format in which Own ACK/NACK information element, and Other ACK/NACK information elements are sandwiched by training patterns (PRE and POST) as shown in FIG. 4, which induce the same advantage as that shown in FIG. 3. In particular, use of the frame format shown in FIG. 3 easily ensures the compatibility with existing format (see FIG. 24).

FIGS. 5 and 6 show frame formats for individual processes if the frame format of FIG. 3 is adopted. As understood from FIGS. 5 and 6, a frame including Own ACK/NACK information element indicating a reception result of a received data piece of another process number "1" additionally includes Other ACK/NACK information elements (each being two bits) indicating reception results of received data pieces of five process numbers "6" to "2" (as a result of multiplication).

Similarly, a frame including Own ACK/NACK information element indicating the reception result of a received data piece of the process number "2" additionally includes Other ACK/NACK information elements indicating reception results of received data pieces of process numbers "1" and "6" to "3"; and each frame including Own ACK/NACK information element indicating one of process numbers "3" to "6" additionally includes Other ACK/NACK information elements concerning "N−1" process numbers other than that of the Own ACK/NACK information element.

As described above, the total bits of Other ACK/NACK information elements can be properly modified. In addition, a ratio of ACK/NACK information for the same process number which information is to be mapped as another ACK/NACK information element in ACK/NACK information for other N processes, i.e, the number of times of repeating an Other ACK/NACK information element for the same process number may also be properly modified. For example, Other ACK/NACK information elements each of which is five bits and which are for two processes may be added as shown in FIG. 7.

The number of Other ACK/NACK information elements that are to be added to Own ACK/NACK information for a different process number and the number of bits of each Other ACK/NACK information element can be properly modified in accordance with a parameter (e.g., an SIR value) indicating a communication environment (radio communication environment) between mobile station 1 and base station 21 and other factors.

For example, in a fine communication environment, the number of processes whose reception results are indicated by Other ACK/NACK information elements and the number of bits for an Other ACK/NACK information element can be reduced and that makes it possible to reduce an amount of data required for ACK/NACK information, inhibiting the possibility in occurrence of ACK/NACK-information misrecognized (misjudgment).

Conversely, in a poor communication environment, increases in the number of processes whose reception results are indicated by Other ACK/NACK information elements and the number of bits for an Other ACK/NACK information element can further inhibit the possibility in occurrence of ACK/NACK-information misrecognized.

These functions are realized by the functions possessed by MUX 19. Specifically, MUX 19 of this embodiment serves to function as an added bit number changing section for changing the number of bits of an Other ACK/NACK information element (second information element) that are to be added to an Own ACK/NACK information element (first information element) according to a radio communication environment (e.g., an SIR value) between base station 21 that is the transmission source communication apparatus of received (data) signals and mobile station 1 that is the transmission destination communication apparatus of the received (data) signals. MUX 19 also function as a training pattern adding section which adds a predetermined training pattern information element, in addition to Other ACK/NACK information elements (second information element), to the Own ACK/NACK information element (first information element).

An ACK/NACK judgment made in base station 21 on the basis of two kinds of ACK/NACK information transmitted from mobile station 1 to base station 21 increases the redundancy of ACK/NACK information indicating the reception result of a received data piece of each individual process number and can thereby reduce the possibility of misrecognition on ACK/NCAK information as compared with the case where the reception result of the data piece are corresponded only to a single ACK/NACK information element, which is transmitted to base station 21.

(Description of Base Station 21)

Base station 21 shown in FIG. 2 is an apparatus that performs a transmission and receiving process on data (packets) in accordance with the process numbers described above. Base station 21 of the present embodiment includes upper layer processor 22, data frame processor 23, CRC attaching section 24, channel coder 25, modulator 26, transmitter 27, duplexer 28, antenna 29, receiver 30, ACK/NACK combination judging section 31, retransmitting controller 32, buffer 33 for retransmission, and scheduler 34.

Upper layer processor 22 has functions for performing various data processes for upper layers of the layer 2 or higher on transmitting data destined for mobile station 1 and for inputting service information that is obtained through the above data processes on transmission data into scheduler 34 and ACK/NACK combination judging section 31. Service information represents of a kind of each data piece (packet) transmitted and received mobile station 1 and base station 21. Scheduler 34 discriminates service information whether the packet in question does not require a real-time process as mail transmission and receipt or require a real-time process as streaming communication.

Data frame processor 23 frames transmission data from upper layer processor 22 into a predetermined frame format under control by scheduler 34, and CRC attaching section 24 attaches a CRC code to be used for a CRC check to transmission data (frame) from data frame processor 23.

Channel coder 25 performs a channel coding process using a turbo code or a convolutional code on the transmission frame from CRC attaching section 24. Modulator 26 modulates the transmission frame on which the channel coding process has been performed by mapping the frame into symbols each having a signal point for a predetermined modulation method such as QPSK or 16QAM.

Transmitter 27 performs a required radio communication process including DA (Digital to Analog) conversion and frequency up-conversion to RF (Radio Frequency) on the transmission frame from modulator 26. Duplexer 28 sends the transmission RF signal to antenna 29 and sends an RF signal received at antenna 29 to receiver 30.

Antenna 29 radiates the transmission RF signal from duplexer 28 to the aerial space to reach mobile station 1, and receives an RF signal transmitted from mobile station 1.

Receiver 30 performs a required radio communication process including frequency down-conversion to a baseband frequency and AD (Analog to Digital) conversion on data received from mobile station 1 through antenna 29 and duplexer 28. While undergoing the succession of the required radio communication process, receiver 30 can extract Own ACK/NACK information element, Other ACK/NACK information elements, and an SIR value (or CQI) from the received data. In other words, receiver 30 functions as receiving means for receiving, from mobile station 1, data in which Other ACK/NACK information elements (second information elements) indicating reception results of received data pieces of other process numbers are added to Own ACK/NACK information element (first information element) indicating a reception result of a received data piece of a certain process number as described above.

ACK/NACK combination judging section 31 judges ACK/NACK information on the basis of an SIR value (or CQI), Own ACK/NACK information element, and Other ACK/NACK information elements extracted in receiver 30 and service information from upper layer processor 22, and sends the judgment result (Final Result ACK/NACK) to scheduler 34 and to retransmitting controller 32. In other words, ACK/NACK combination judging section 31 functions as judging means for judging a reception result of a data piece that base station 21 has transmitted to mobile station 1 in accordance with Own ACK/NACK information element and Other ACK/NACK information elements included in data received by receiver 30. If ACK/NACK information from mobile station 1 does not arrive at base station 21 within a predetermined time period set by a T1 timer shown in FIG. 20, an ACK/NACK judgment can be made on the basis of ACK/NACK information data that have already arrived at that time.

More specifically, since ACK/NACK information elements of other process numbers are always intermittently transmitted to base station 21 during data communication but Other ACK/NACK information element indicating a reception result is not received when the last data piece is being received, the T1 timer discontinues receipt of ACK/NACK information. Further, in the event of disconnection of data communication, discontinuation of receipt of ACK/NACK information elements by the T1 timer is required because data delay occurs unless received data is notified to the upper layer. In this case, the T1 timer is set to be within a delay time permissible by the upper layer. For example, the T1 timer set to be 20 ms or shorter makes voice communication to prevent dialog response from lowering.

The T1 timer is set to be a time period, after which a data piece would not be retransmitted in the lower layer, and therefore notifies the upper layer that no data is to be retransmitted even if the upper layer waits any longer. The time period of the T1 timer is set in the both transmitting side (base station 21) and receiving side (mobile station 1).

As described above, in combination and judgment of ACK/NACK information, if base station ACK/NACK combination judging section 31 judges that Other ACK/NACK information element for another process number is not received despite of further waiting, an ACK/NACK judgment is made on the basis of ACK/NACK information that has been received until that time. There is no need to always use T1 timer, but alternatively another timer same in function with the T1 timer may be prepared.

ACK/NACK combination judging section 31 optionally has a function for correcting a received Own ACK/NACK information element. For example, if the majority (e.g., eight bits out of total ten bits) of bits of an Own ACK/NACK information element is "1", all the bits can be corrected to be "1". In the same manner, if the majority (e.g., eight bits out of total ten bits) of bits of an Own ACK/NACK information element is "0", all the bits can be corrected to be "0".

Retransmitting controller 32 controls retransmission of transmission data in accordance with the result of ACK/NACK information judgment made by ACK/NACK combination judging section 31.

Buffer 33 for retransmission temporarily retains a transmission frame which has been channel-coded in channel coder 25 until the frame is retransmitted (to mobile station 1), and takes the form of a dedicated memory (not shown) containable data for the number of processes or a common memory (not shown) installed in base station 21. Under retransmission control from retransmitting controller 32, buffer 33 sends a transmission frame in question to channel coder 25 again.

Scheduler 34 schedules transmission of transmission frames according to the service information from upper layer processor 22 and the result of ACK/NACK judgment from ACK/NACK combination judging section 31. Scheduler 34 controls a schedule of processes to be performed by data frame processor 23 so that, if no retransmission is being required, a transmission frame of a new process number is transmitted for example.

(Description Operation Performed in Base Station 21)

Hereinafter, description is briefly made in relation to the entire operation performed in base station 21 having the structure mentioned above. First of all, base station 21 performs a requisite transmission process on transmission data destined for mobile station 1 and transmits the processed transmission data to mobile station 1. Subsequently, base station 21 receives a (data) signal from mobile station 1 through antenna 29, and receiver 30 extracts ACK/NACK information concerning the transmission data from the received data signal. ACK/NACK combination judging section 31 makes an ACK/NACK judgment using the extracted ACK/NACK information. If the result of the ACK/NACK judgment is OK, transmission data of a process number corresponding to the ACK/NACK information is judged to have been normally received by mobile station 1 and base station 21 transmits new transmission data, as the ensuing data of the transmission data of the process number, to mobile station 1. On the other hand, if the result of the ACK/NACK judgment is NG, transmission data of a process number corresponding to the ACK/NACK information element is judged not to be normally received by mobile station 1 and base station 21 transmits retransmitting data, as the ensuing data of the transmission data of the process number, to mobile station 1.

(Description of a Judgment Process on ACK/NACK Information Element)

Next, a judgment process performed on ACK/NACK information element will now be described with reference to FIG. 6, which focuses on ACK/NACK information elements concerning transmission data of the process number "1" in the frame format table in FIG. 5.

FIG. 6 indicates that base station 21 receives Own ACK/NACK information element for transmission data piece of the process number "1" in the form of 10-bit data "1111111111" and also five two-bit Other ACK/NACK information elements "11", "10", "00", "11" and "11" attached to Own ACK/NACK information elements concerning the remaining five processes from mobile station 1. Hereinafter, two-bit digits "00" and "10" are called ACK information (sometimes simplified as ACK) and NACK information (sometimes simplified as NACK) information, respectively, and two-bit digit of "10" represents DTX.

On the basis of this Own ACK/NACK information element and these Other ACK/NACK information elements, ACK/NACK combination judging section 31 judges whether the reception result of the transmission data pieces in question is ACK or NACK by undergoing, for example, hard-decision combination. For example, if at least one of the above Own and Other ACK/NACK information elements that have been received is ACK information, base station 21 judges that the transmission data piece of the process number in question has been normally received by mobile station 1.

Alternatively, ACK/NACK combination judging section 31 may judge whether the result of the reception result of the data piece in question is ACK or NACK by undergoing soft-decision combination based on the Own and Other ACK/NACK information elements. For example, assuming that ACK information, NACK information and DTX information are allocated scores "2", "−2", and "0", respectively, the total score of the above Own and Other ACK/NACK information elements of "0" or more judges the reception result received from mobile station 1 to be ACK and conversely the total score of less than "0" judges the reception result to be NACK. In the example shown in FIG. 6, the score of the Own ACK/NACK information element is "10" and those of the five Other ACK/NACK information elements are "2", "0", "−2", "2", and "2", the total of which is "14". Accordingly, the total score judged to be 0 or more causes base station 21 to judges the transmission data piece in question has been normally received in mobile station 1.

As described above, base station 21 confirms receipt of a transmission data piece of a certain process number according to ACK/NACK information (i.e., Other ACK/NACK information elements) received for a reception confirmation of other transmission data pieces of other process numbers in addition to the Own ACK/NACK information element. Thereby increase in redundancy of ACK/NACK information element reduces the possibility of occurrence of misrecognition to be made on received ACK/NCAK information elements as compared with the case where the reception result of the data piece of a process number are corresponded to a single ACK/NACK information element, which is transmitted to base station 21.

(Description of Operation Performed in the Entire System)

Figure 8:
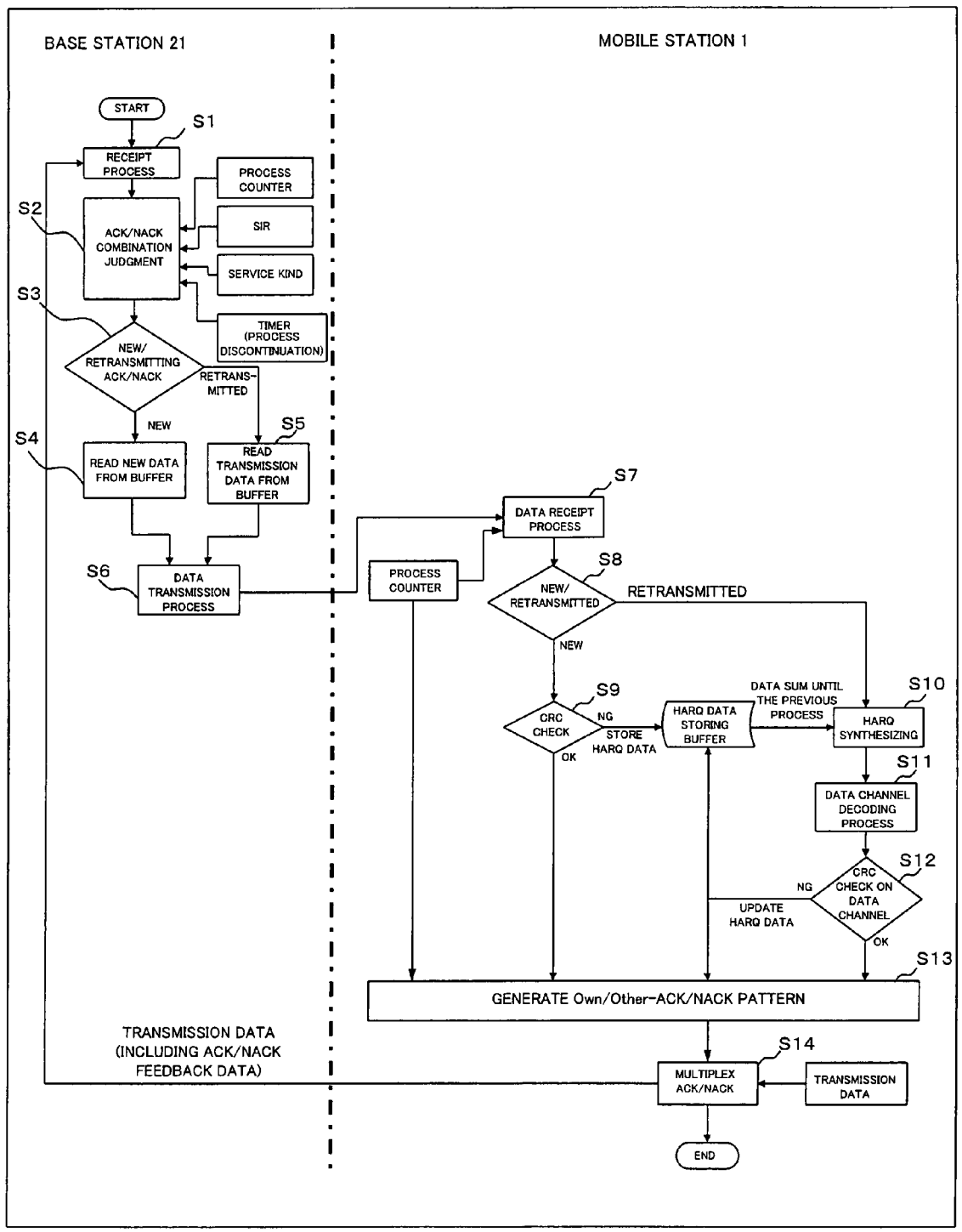
FIG. 8 is a flow chart illustrating a succession of procedural steps performed in the radio communication system according to the first embodiment of the present invention.

Communication between mobile station 1 and base station 21 will now be described with reference to flow diagram FIG. 8.

First off all, on the base station 21 side, receiver 30 receives ACK/NACK information transmitted from mobile station 1 (step S1), and ACK/NACK combination judging section 31 judges the received ACK/NACK information element on the basis of a process count (process number), an SIR, a service kind (service information from upper layer processor 22), and a timer (T1 timer) value (steps S2 and S3). In this example, the judgment is made by a soft-decision combination process.

If the result of the judgment is ACK, the procedure takes the "new" route in step S3 to prompt scheduler 34 to read new data piece from a buffer (step S4). Conversely, if the result of the judgment is NACK, the procedure takes the "retransmission" route in step S3 to prompt channel coder 25 to read retransmission data piece from buffer 33 under retransmission control by retransmitting controller 32 (step S5).

In succession, base station 21 performs a predetermined transmission process on the new or retransmission data, which is then transmitted to mobile station 1 by transmitter 27 (step S6).

In the meanwhile, on the mobile-station-1 side, control channel receipt processor 4 and data channel receipt processor 5 perform a data reception process on the transmission data piece (new data or retransmitted data) that has been transmitted from base station 21 (step S7).

On the basis of the data pieces undergone the reception process and the process number notification from process counter 20, judgment is made on as to whether the received data piece is new data piece or retransmitted data piece (step S8). Here, judgment to be new data piece takes the "new" route in step S8 and prompts CRC checker 13 to perform CRC check on the received data piece (step S9). The result of the CRC check is NG, the procedure takes the "NG" route in step S9 to store HARQ information (such as data for combination of retransmission) into HARQ information retaining buffer (memory buffer for combination of retransmission) 11. In contrast, if the CRC check results in OK, the procedure takes the "OK" route in step S9 to cause ACK/NACK generator 18 to generate ACK/NACK information (step S13).

If the received data piece is judged to be retransmitted data piece, the procedure takes the "retransmission" route in step S8 to prompt combining retransmission section 10 to read data for combination of retransmission from memory buffer 11 and carries out an HARQ combination process on the read data (step S10).

Then the data that has been subjected to the HARQ combination is subjected to a data channel decoding process by channel decoder 12 (step S11) and further to a CRC check on CRC checker 13 (step S12).

If the result of the CRC check is NG, the procedure takes the "NG" route in step S12 to update the HARQ data stored in the HARQ information retaining buffer and ACK/NACK generator 18 generates ACK/NACK information (step S13).

If the result of the CRC check is OK, the procedure takes the "OK" route in step S12 to prompt ACK/NACK generator 18 to generate ACK/NACK information (step S13).

The ACK/NACK information (Own ACK/NACK information element and Other ACK/NACK information elements) generated by ACK/NACK generator 18 and transmission data destined for base station 21 are multiplexed by MUX 19 (step S14), and the data generated as a result of the multiplication is transmitted to base station 21 by transmission processor 7.

Mobile station 1 transmits ACK/NACK information indicating the reception result of a data piece that base station 21 has transmitted to mobile station 1, which information serves as feedback, to base station 21 in the manner described above.

Figure 9:
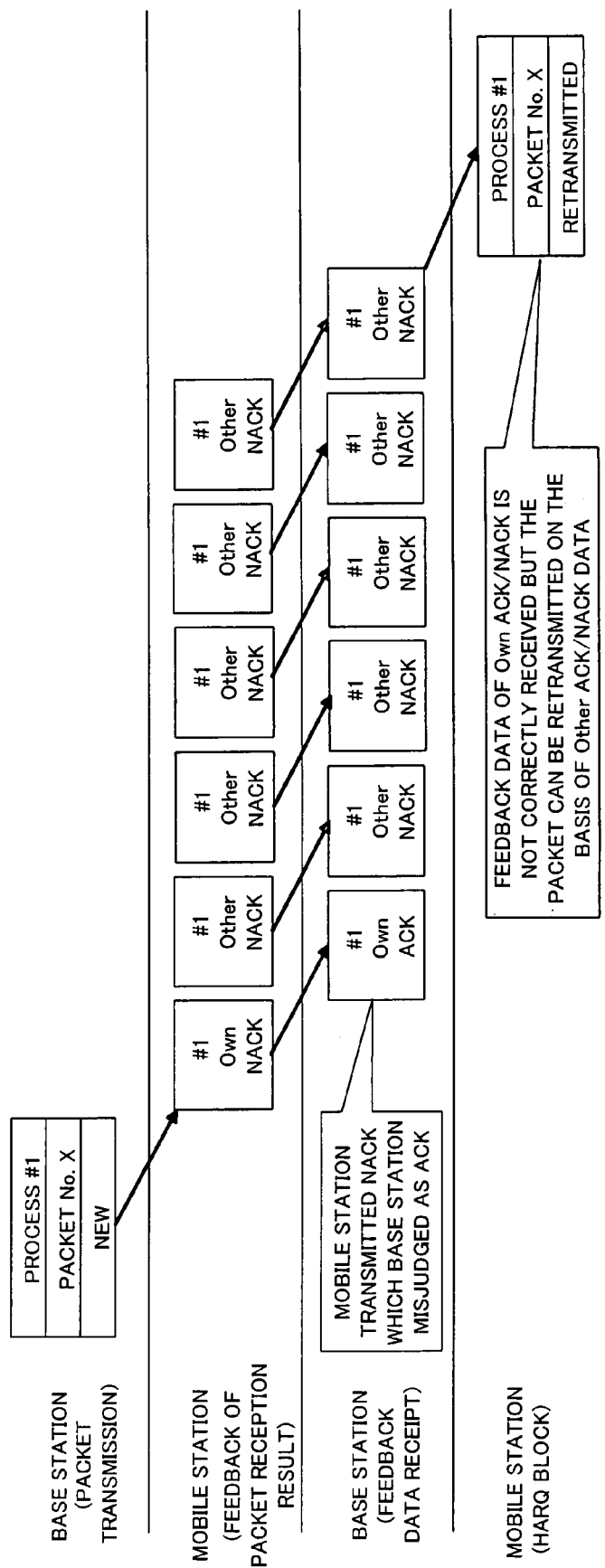
FIG. 9 is a diagram schematically illustrating an example of operations performed in the radio communication system according to the first embodiment of the present invention.

Next, description will be made in relation to judgment made on ACK/NACK information of the first embodiment using an example shown in FIG. 9. FIG. 9 schematically shows data communication (a retransmission process) carried out when at least one of the ACK/NACK information elements misrecognizes the reception result.

In a communication system of the N-channel stop-and-wait method (here, N=6), when base station 21 transmits (executes packet transmission of) new data piece having the process number "1" (Process #1), and the packet number "X" (Packet No. X), mobile station 1 transmits NACK information which indicates that mobile station 1 has not normally received the data piece in question from base station 21 and which takes the form of an Own ACK/NACK information element and Other ACK/NACK information elements to base station 21 (feedback of the reception result of the packet).

Base station 21 receives ACK/NACK information (feedback information) from mobile station 1, and misrecognizes the Own ACK/NACK information from mobile station 1 (i.e., misrecognized of ACK information to be NACK information). In other words, mobile station 1 transmits NACK information which base station 21 however misrecognizes as ACK information.

However, base station 21 recognizes each Other ACK/NACK information element to be NACK information and therefore can correctly confirm (judge) the ACK/NACK information from mobile station 1 to be NACK information by making, for example, soft-decision combination. As the result of the correct judgment, base station 21 can retransmit the same data piece of the process number "1" (Process #1) and the packet number "X" (Packet No. X) (HARQ block).

As described above, since base station 21 can confirm the reception result of a transmission data piece of a certain process number on the basis of Other ACK/NACK information elements in addition to the Own ACK/NACK information element, redundancy of ACK/NACK information indicating a receipt result of transmission data piece of a certain process number makes it possible to reduce the possibility of misrecognition on ACK/NACK information that occurs during transmission and receipt of the ACK/NACK information as compared with the case where the reception result of the data piece are related to a single ACK/NACK information element.

Hereinafter, a modification of base station 21 will now be described with reference to FIGS. 10-19.

(B) Description of Modification

Figure 10:
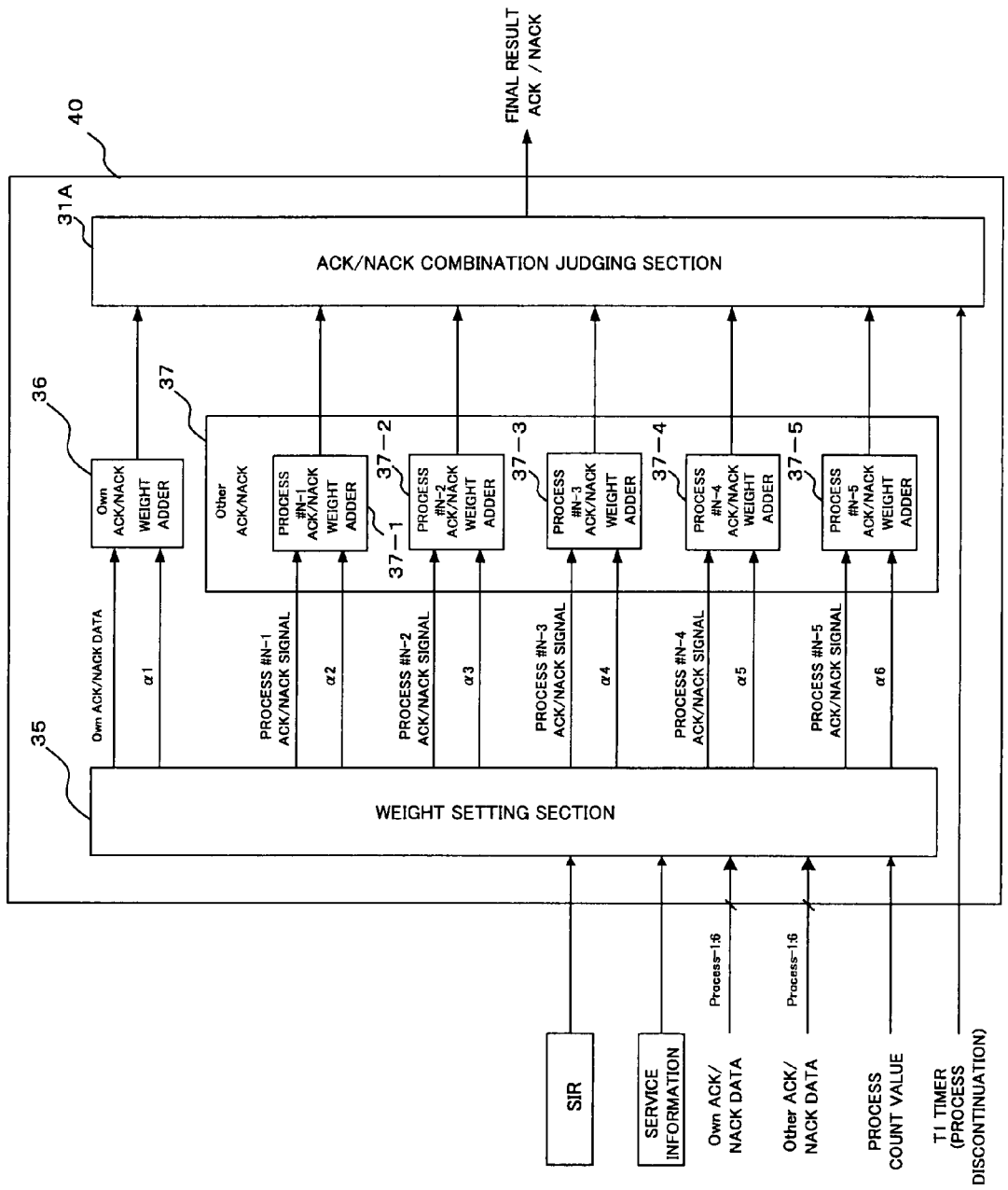
FIG. 10 is a block diagram schematically illustrating a weighting section according to a modification of the present invention.

In this modification, base station 21 substitutes weighting judgment section 40 shown in FIG. 10 for ACK/NACK combination judging section 31. Further, this modification assumes N=6 for simplified explanation.

Weighting judgment section 40 makes a weighting combination among an Own ACK/NACK information element (first information element) and Other ACK/NACK information elements (second information elements) and judges (confirms) ACK/NACK information.

For this purpose, weighting judgment section 40 includes weight setting section 35, first weight adder 36, second weight adder 37, and ACK/NACK combination judging section 31A.

Here, on the basis of an SIR value, service information, and a process count (process number) weight setting section 35 outputs a weight $\alpha 1$ for an Own ACK/NACK information element and the Own ACK/NACK information element to the downstream first weight adder (adder for Own ACK/NACK weight) 36 and also outputs weights $\alpha 2$ to $\alpha 6$ one for each of Other ACK/NACK information elements and the Other ACK/NACK information elements (Process #N−1 ACK/NACK Signal to Process #N−5 ACK/NACK Signal) to downstream second weight adder (adder of Other ACK/NACK weight) 37.

First weight adder 36 combines (multiplies) an Own ACK/NACK information element and weight $\alpha 1$ for Own ACK/NACK information element, and second weight adder 37 combines (multiplies) an Other ACK/NACK information element and corresponding one of weights $\alpha 2$ to $\alpha 6$ for Other ACK/NACK information elements. In detail, second weight adder 37 includes process-specific weight adders (Process #N-M ACK/NACK Weight adders) 37-1 to 37-M (one for each of the process numbers) (here, M=1, 2, . . . , N−1 (natural numbers), here M=5).

Process-specific weight adder 37-1 combines (multiplexes) Process #N−1 ACK/NACK Signal from weight setting section 35 and weight $\alpha 2$, and the remaining process-specific weight adders 37-2 to 37-5 similarly function.

ACK/NACK combination judging section 31A outputs the ultimate judgment result on ACK/NACK information (Final Result ACK/NACK) considering the Own ACK/NACK information element and the Other ACK/NACK information elements which have been weighted by first weight adder 36 and second weight adder 37, respectively. Specifically, ACK/NACK combination judging section 31A determines scores for Own and Other ACK/NACK information elements, carries out a soft-decision combination and finally outputs the judgment result on ACK/NACK information, similarly to the foregoing embodiment. In other words, ACK/NACK combination judging section 31A functions as a weighting combining section for making a weighting combination among Other ACK/NACK information elements.

(Description of Process for Weighting Judgment)

Hereinafter, description will now be made in relation to an operation performed by weighting judgment section 40 using the weight patterns shown in FIGS. 11-15.

FIG. 11 is a table showing ACK/NACK information elements (i.e., an Own ACK/NACK information element and Other ACK/NACK information elements), scores for the ACK/NACK information elements, and a judgment result on the ACK/NACK information when weight $\alpha 1$ is assumed to be "1" and each of weights $\alpha 2$ to $\alpha 6$ to be "0".

In the example shown in FIG. 11, Own ACK/NACK information element is "1111111111", other ACK/NACK information elements are "11", "11", "10", "00", and "11", weight $\alpha 1$ is "1", and each of weights $\alpha 2$ to $\alpha 6$ is "0". The total score is $10 \times 1 + 2 \times 0 + 2 \times 0 + 0 \times 0 + (-2) \times 0 + 2 \times 0 = 10 \ (\geqq 0)$, which causes base station 21 to judge (confirm) the judgment result on the ACK/NACK information to be ACK.

In the example of FIG. 11, weight $\alpha 1$ set to be "1" and each of weights $\alpha 2$ to $\alpha 6$ set to be "0" make it possible to make an ACK/NACK judgment on ACK/NACK information same as conventional ACK/NACK information whereby compatibility with a conventional format (PRE, ACK/NACK, POST) can be maintained. However, the accuracy in detection of ACK/NACK information (a misrecognition occurrence rate) in this modification is the same as the conventional manner.

Use of such a weighting pattern causes an interface with a base station for a conventional system, which does not support the frame format of the first embodiment of the present invention, to receive the frame format of the present invention in the same manner as a conventional frame format simply by setting the above weights without chaining the circuit configuration of the base station.

FIG. 12 is a table showing ACK/NACK information elements (i.e., Own ACK/NACK information element and Other ACK/NACK information elements), scores for the ACK/NACK information elements, and a judgment result on the ACK/NACK information if weight $\alpha 1$ is assumed to be "1" and each of weights $\alpha 2$ to $\alpha 6$ to be "0.5".

In the example shown in FIG. 12, the Own ACK/NACK information element is "1111111111", the other ACK/NACK information elements are "11", "11", "10", "00", and "11", weight $\alpha 1$ is "1", and each of weights $\alpha 2$ to $\alpha 6$ are "0.5". The total score is $10 \times 1 + 2 \times 0.5 + 2 \times 0.5 + 0 \times 0.5 + (-2) \times 0.5 + 2 \times 0.5 = 12 (\geqq 0)$, which causes base station 21 to judge (confirm) the judgment result on the ACK/NACK information to be ACK.

In the example of FIG. 12, redundancy of ACK/NACK information is increased by setting weight $\alpha 1$ to be "1" and each of weights $\alpha 2$ to $\alpha 6$ to be "0.5". Alternatively, weights $\alpha 2$ to $\alpha 6$ can be set to be "1". However, such setting of weights for other ACK/NACK information elements may contrarily increase the possibility of misrecognition of ACK/NACK information on the base-station-21 side if the weights are improperly set. For example, in a fine communication environment between mobile station 1 and base station 21 (in a static state of the radio propagation environment, i.e., in a hot spot), setting weights $\alpha 2$ to $\alpha 6$ to be "1" doubles the redundancy of ACK/NACK information. In a variable communication environment between mobile station 1 and base station 21, that is, in an environment in which SIR largely fluctuates, setting weights $\alpha 2$ to $\alpha 6$ to be "0.5" emphasize the reception result of an Own ACK/NACK information element.

FIG. 13 is a diagram showing an operation performed in weighting judgment section 40 if the Own ACK/NACK information element is not received under the setting of weights shown in FIG. 12.

In the example shown in FIG. 13, the Own ACK/NACK information element is "not received (no data)", other ACK/NACK information elements are "11", "11", "10", "00", and "11", weight $\alpha 1$ is "1", and each of weights $\alpha 2$ to $\alpha 6$ is "0.5". The total score is $0 \times 1 + 2 \times 0.5 + 2 \times 0.5 + 0 \times 0.5 + (-2) \times 0.5 + 2 \times 0.5 = 2 (\geqq 0)$, which causes base station 21 to judge (confirm) the judgment result on the ACK/NACK information to be ACK.

As described above, even if base station 21 does not receive the Own ACK/NACK information element, judgment on ACK/NACK information can be made on the basis of the Other ACK/NACK information elements.

FIG. 14 is a table showing ACK/NACK information elements (i.e., Own ACK/NACK information element and Other ACK/NACK information elements), scores for the ACK/NACK information elements, and a judgment result on the ACK/NACK information if weights $\alpha 1$ and $\alpha 3$ are assumed to be "1" and each of weights $\alpha 2$ and $\alpha 4$ to $\alpha 6$ to be "0.5". In this example, since all the bit in Own ACK/NACK information element are the same digits of "1" or the same digits of "0" when data of Process #N–2 is received, the data for the process in question is received in a fine state (in a fine communication environment) and Other ACK/NACK information element received at Process #N–2 is highly reliable. Consequently, weight $\alpha 3$ for Process #N–2 is set to be larger.

In this case, the Own ACK/NACK information element is "1100111100", other ACK/NACK information elements are "11", "11", "10", "00", and "11", weights $\alpha 1$ and $\alpha 3$ are "1", and each weights $\alpha 2$ and $\alpha 4$ to $\alpha 6$ is "0". The total score is $(6-4) \times 1 + 2 \times 0.5 + 2 \times 1 + 0 \times 0.5 + (-2) \times 0.5 + 2 \times 0.5 = 5 (\geqq 0)$, which causes base station 21 to judge (confirm) the judgment result on the ACK/NACK information to be ACK.

Use of such a weighting pattern makes it possible to set weights based on reliability of a reception result for each process, and ACK/NACK information can be thereby controlled focusing on a process received in a fine state (in a fine communication environment), so that a variation in a reception state can be compensated with ease.

Specifically, at the time of confirmation of reception result of a received data piece of a certain process number, if a reception result of an Own ACK/NACK information element indicating a reception result of a received data piece of another process number is stable (ALL "1" or ALL "0"), the communication environment when communication of the another process can be judged to be fine. Accordingly, a weight "1" can be set for Other ACK/NACK information element attached to an Own ACK/NACK information element of a process number received in a fine communication environment and a weight "0" can be set for Other ACK/NACK information elements for the remaining process number. Such a weight setting manner can further reduce an occurrence rate of misrecognition made on ACK/NACK information.

Next description will now be made, with reference to FIG. 15, in relation to a weighting pattern that can be applied to the case where the weighting patterns shown in FIGS. 11-14 can hardly judge ACK/NACK information (e.g., the case of the total score being "0"). In the weighting matter shown in FIG. 15, the score of an Own ACK/NACK information element and the subtotal score of Other ACK/NACK information elements are independently calculated and on the basis of the scores, weights are then set.

For example, on the assumption that weight $\alpha 1$ is set to be "1", the score of the Own ACK/NACK information element "1111110000" is calculated to be $(6-4)\times 1=2$, and on the assumption that weights $\alpha 2$ to $\alpha 6$ are set to "1", the subtotal score of Other ACK/NACK information elements "00", "00", "00", "11", and "11" is calculated to be $(-2)\times 1+(-2)\times 1+(-2)\times 1+2\times 1+2\times 1=-2$. The total score at that time is "0", which judges the ACK/NACK information to be low in reliability.

In the above case, the weighting pattern example shown in FIG. 15 sets weights $\alpha'$, considering SIR values when received data for each process is received. In the illustrated example, the SIR value when reception of the Own ACK/NACK information element is assumed to be larger than that when reception of Other ACK/NACK information elements, weight $\alpha'$ for the score of the Own ACK/NACK information element and weight $\alpha'$ for the subtotal score of the Other ACK/NACK information elements are set to be "1" and "0.5", respectively.

As the example described with reference to FIG. 15, each weight determined by a number of combination processes makes it possible to develop flexibility in judgment on ACK/NACK information as compared with the weighting patterns shown in FIGS. 11-14.

(Description of a Weight Setting Manner)

Hereinafter, a setting manner of the above weights will now be described with reference to FIGS. 16-18.

FIG. 16 shows an example of a weight for an Own ACK/NACK information element which weight is determined on the basis of parameters of a communication environment; and FIG. 17 is an example of a weight for an Other ACK/NACK information element which weight is determined on the basis of parameters of a communication environment.

Here, description is firstly made for the above parameters (SIR fluctuation, a receiving-timing SIR value, an own process deviation, and service kind).

SIR fluctuation is exemplified by a parameter that indicates a value of SIR fluctuation (or a deviation) in the time period (T) for six processes. An SIR fluctuation value of a threshold value or more is judged to be "stable" but that less than the threshold value is judged to be "fluctuating".

Figure 18:
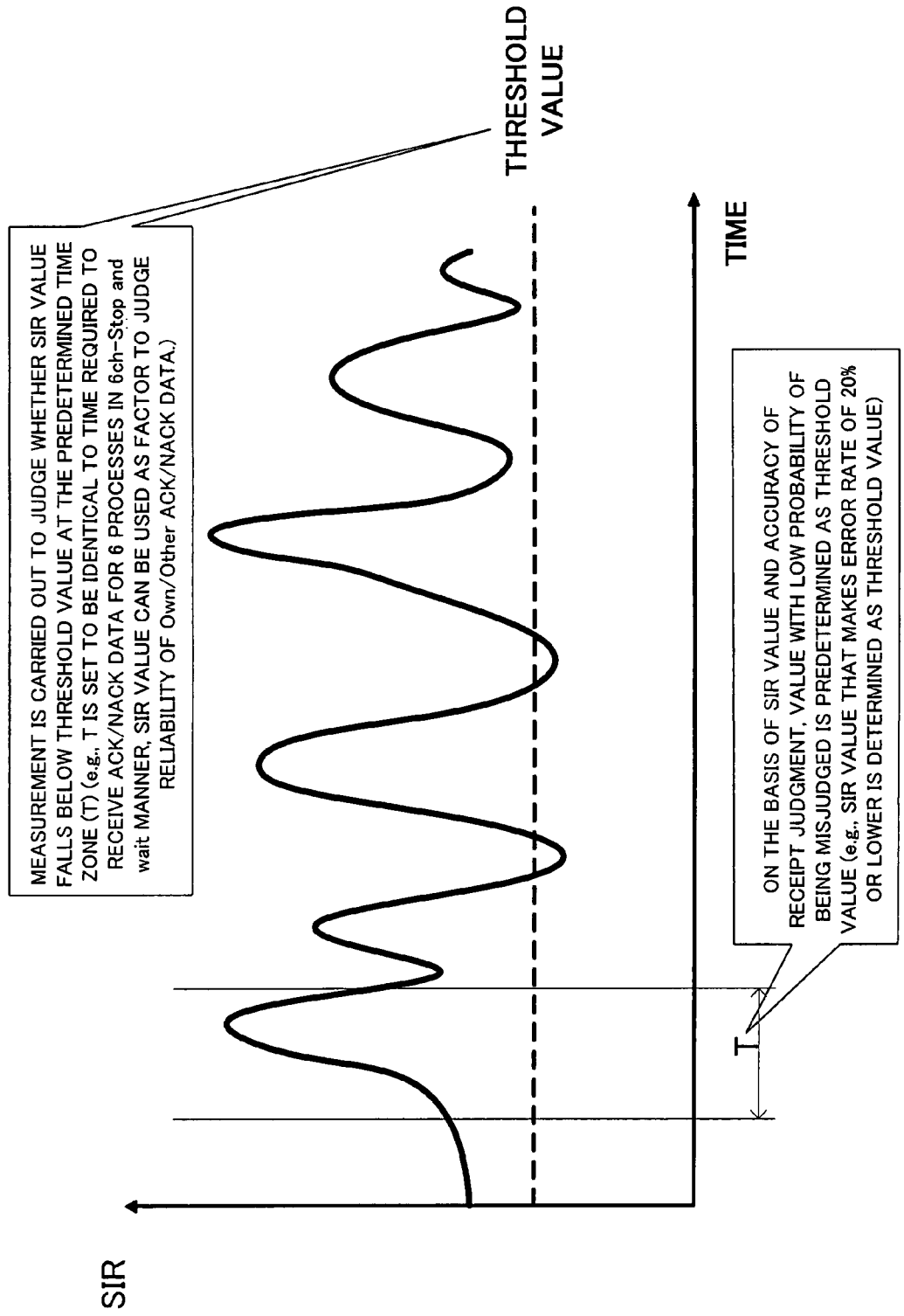
FIG. 18 is a diagram illustrating an example of relationship between a weight and an SIR value according to an modification of the present invention.

As shown by an example of SIR fluctuation in FIG. 18, an SIR fluctuation can be judged according to the case; if an SIR fluctuation (the average or the deviation) within the above time period T is a predetermined threshold value or more, the SIR fluctuation is judged to be "stable", and the SIR fluctuation other than the above value range is judged to be "fluctuating". The threshold value is predetermined so as to make the misrecognition possibility low on the basis of an SIR value and the accuracy in receipt judgment and is exemplified by an SIR value which results in an error rate of 20% or less.

A receiving-timing SIR value is judged to be "high" if the SIR value at the time when receipt of ACK/NACK information (the Own ACK/NACK information element) corresponding to the received data pieces of the own process number is the threshold value or more, and is judged to be "low" if the SIR value is other than the above "high" case.

An own process deviation is judged to be "large" if the bits in Own ACK/NACK information element corresponding to the received data piece of each process deviates from a predetermined ratio, and is judged to be "small" in the remaining case. For example, if 80 percent or more of all the bits of an Own ACK/NACK information element are the same digits of "1" or "0", the Own ACK/NACK information element is judged to be "large", and the Own ACK/NACK information element is judged to be "small" in the case except the above.

A service kind is used to determine the largeness of weight according to each service. For example, communication such as mail transmission and receipt that does not require a real-time process is represented by NRT (Non Real Time) and communication such as streaming communication that requires a real-time process is represented by RT (Real Time) It is possible to improve the reliability of an SIR fluctuation by allocating a large weight to series of NRT data that intermittently transmitted.

On the basis of parameters set in the above manners, weights are determined as shown in the examples of FIGS. 16 and 17. In these examples, a weight is set to be larger if an SIR fluctuation is "stable", the receiving-timing SIR value is "high", an own process deviation is "large" and a service kind is "RT".

Figure 19:
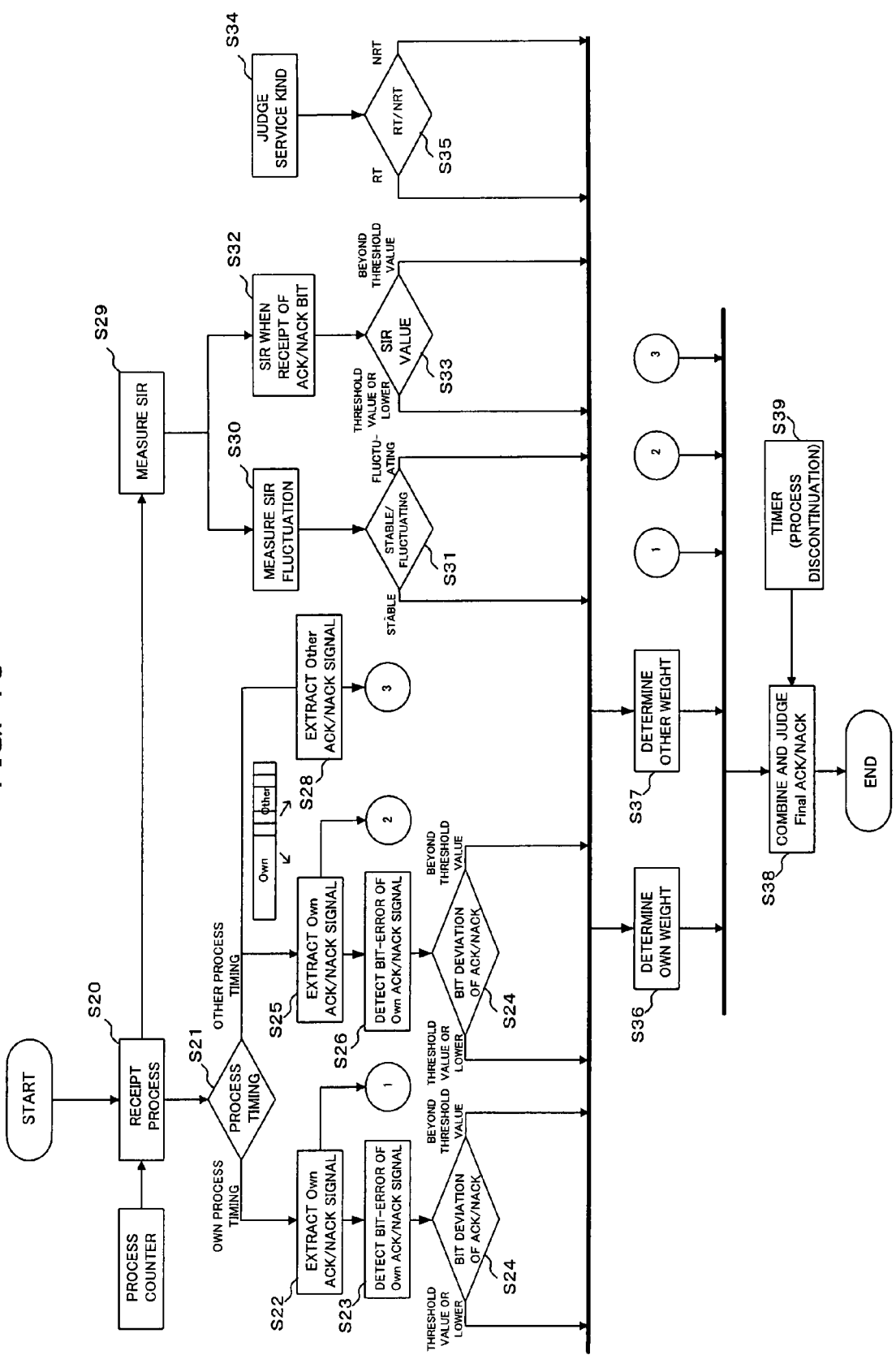
FIG. 19 is a flow diagram illustrating a succession of procedural steps performed in a radio communication system according to a modification of the present invention.
Figure 21:
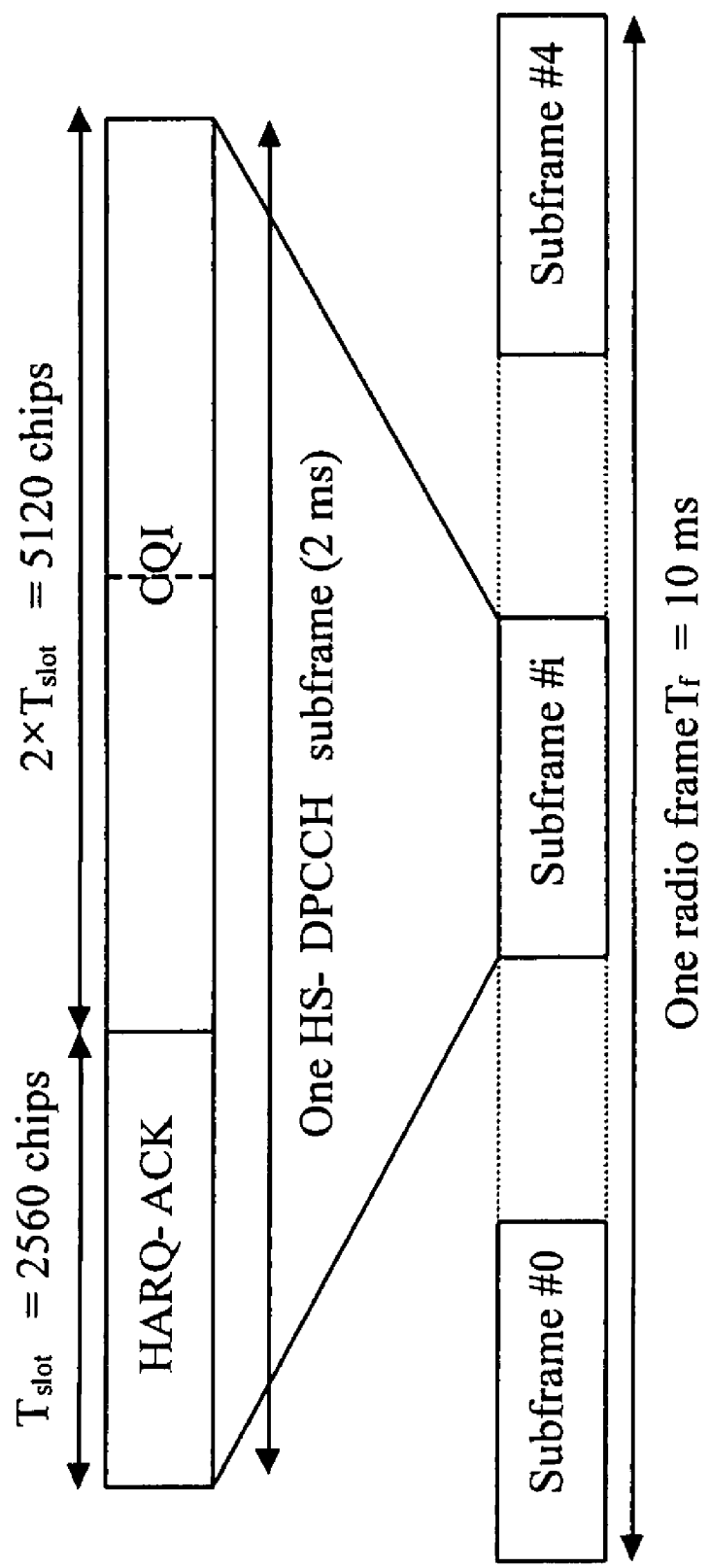
FIG. 21 is a diagram schematically illustrating a frame structure of HS-DPCCH.

In succession, a setting manner for the above weight is detailed with reference to FIG. 19, which is a flow diagram showing a succession of procedural steps performed to setting a weight.

First of all, base station 21 receives ACK/NACK information transmitted by mobile station 1 (step S20) and weighting judgment section 40 then judges the process timing on the basis of a process count (a process number) (step S21). Here, if weighting judgment section 40 judges that data transmitted by mobile station 1 concerns the own process timing, weighting judgment section 40 takes the own process-timing route in step S21 to extract the Own ACK/NACK information element from the received data (step S22), and performing CRC check on the Own ACK/NACK information element detects a bit error in the Own ACK/NACK information element (step S23). Further, weighting judgment section 40 judges whether or not the Own ACK/NACK information element of the own process has the ACK/NACK bit deviation equal to or more than the threshold value (e.g., 80%) (step S24).

On the other hand, if weighting judgment section 40 judges that the data transmitted by mobile station 1 is another process timing, weighting judgment section 40 takes the other process-timing route in step S21 to extract Own ACK/NACK information element of another process from the received data (step S25). In succession weighting judgment section 40 performs a CRC check on the extracted Own ACK/NACK information element to detect a bit error in the Own ACK/NACK information element of the process other than the own process (step S26) Further, weighting judgment section 40 judges whether or not the Own ACK/NACK information element of another process has the ACK/NACK deviation equal to or more than the threshold value (e.g., 80%) (step S27).

If weighting judgment section 40 judges that the data transmitted by mobile station 1 is another process timing, the procedure takes the another process-timing route in step S21 also extract Other ACK/NACK information element of the process other than the own process (step S28).

In addition, base station 21 measures an SIR value based on the received data transmitted by mobile station 1 in order to obtain the above parameters (an SIR fluctuation, a receiving-timing SIR value and a service kind) (step S29).

Weighting judgment section 40 further measures a fluctuation (the average or the deviation) in the SIR value within the time period T (step S30) and judges whether or not the result of the measurement is equal to or more than the threshold value (step S31).

In the meanwhile, weighting judgment section 40 also measures the SIR value at the time when ACK/NACK information is being received (step S32) and judges whether or not the measurement result is the predetermined threshold value or more (step S33).

Still further, weighting judgment section 40 discriminates a service kind on the basis of the received data transmitted by mobile station 1 (step S34) to judge whether the service kind is "RT" or "NRT" (step S35).

From the judgment result obtained in steps S24, S27, S31, S33 and S35, weight setting section 35 determines first weight (Own Weight) and second weights (Other weights) (steps S36 and S37).

On the basis of the time limit by the T1 timer (step S39), first weight adder 36 and second weight adder 37 combine the first weight, the second weights, and measurement results obtained in steps S22, S25, and S28, and ACK/NACK combination judging section 31A outputs the ultimate ACK/NACK judgment result (Final ACK/NACK result) (step S38).

It is possible to highly evaluate reliability of ACK/NACK information corresponding to a process transmitted and received in a fine receiving state (communication environment) by confirming (judging) the ACK/NACK information which has been subjected to weighting combination using the weights determined in the weight setting method described above in base station 21. Thereby, ACK/NACK information judgment flexibility conforming to variation in receiving state can be realized.

Accordingly, since, as compared to the judgment on ACK/NACK information made in the first embodiment, the modification can further reduce an occurrence rate of misrecognition on ACK/NACK information, dead lock caused by misrecognition on ACK/NACK information in base station 21 can be resolved, so that throughput reduction can be avoided. Further, the present invention should by no means be limited to the foregoing embodiment and modification that have been detailed above, and various changes or modifications may be suggested without departing from the gist of the invention.

What is claimed is:

1. A radio communication method in a radio communication system including a first radio communication apparatus which transmits signals according to process numbers and a second radio communication apparatus which receives the signals, the radio communication method comprising:
   in the second radio communication apparatus,
      generating a first information element indicating a reception result for a received signal of a process number, and a second information element indicating a reception result for another received signal of another process number different from the process number corresponding to the first information element;
      transmitting response signals in response to the individual received signals, each of the response signals including both of the first and second information elements, to the first radio communication apparatus; and
   in the first radio communication apparatus,
      judging a reception result of the transmitted signal in accordance with the first information element of the response signal corresponding to the process number and the second information element of another response signal corresponding to the another process number_different from the process number corresponding to the first information element.

2. The radio communication method according to claim 1, wherein the second radio communication apparatus adds two or more of the second information elements indicating reception results for received signals of process numbers other than the process number to the first information element.

3. The radio communication method according to claim 2, wherein the second radio communication apparatus changes the number of second information elements that are to be added to the first information element according to a radio communication environment between the first radio communication apparatus and the second radio communication apparatus.

4. The radio communication method according to claim 1, wherein the second radio communication apparatus further adds a predetermined training pattern information element, in addition to one or more of the second information elements, to the first information element.

5. The radio communication method according to claim 2, wherein the second radio communication apparatus further adds a predetermined training pattern information element, in addition to the one or more second information elements, to the first information element.

6. The radio communication method according to claim 3, wherein the second radio communication apparatus further adds a predetermined training pattern information element, in addition to the one or more second information elements, to the first information element.

7. The radio communication method according to claim 2, wherein the first radio communication apparatus makes a weighting combination among the second information elements.

8. The radio communication method according to claim 1, wherein the first radio communication apparatus makes a weighting combination among the first and second information elements; and
   judges the reception result in accordance with the result of the weighting combination.

9. A radio communication apparatus, for a radio communication system, receives signals transmitted according to process numbers from a radio communication entity of the system, the radio communication apparatus comprising:
   a first generating unit that generates a first information element indicating a reception result for a received signal of a process number;
   a second generating unit that generates a second information element indicating a reception result for another received signal of another process number different from the process number corresponding to the first information element; and
   a transmitting unit that transmits response signals in response to the individual received signals, each of the response signals including both of the first and second information elements, to the radio communication entity.

10. The radio communication apparatus according to claim 9, wherein said transmitting unit includes multiplexing transmission section for adding two or more of the second information elements indicating reception results for received signals of process numbers other than the process number to the first information element and transmitting response signals including both of the first and second information elements.

11. The radio communication apparatus according to claim 10, wherein said transmitting unit includes an added bit number changing section for changing the number of bits of second information elements that are to be added to the first information element according to a radio communication environment between said radio communication apparatus and the first radio communication apparatus.

12. The radio communication apparatus according to claim 9, wherein said transmitting unit includes a training pattern adding section for adding a predetermined training pattern information element, in addition to one or more of the second information elements, to the first information element.

13. The radio communication apparatus according to claim 10, wherein said transmitting unit includes a training pattern adding section for adding a predetermined training pattern information element, in addition to the one or more second information elements, to the first information element.

14. The radio communication apparatus according to claim 11, wherein said transmitting unit includes a training pattern adding section for adding a predetermined training pattern information element, in addition to the one or more second information elements, to the first information element.

15. A radio communication apparatus, for a radio communication system, transmits signals according to process numbers to a radio communication entity of the system, the radio communication apparatus comprising:

a receiving unit that receives response signals respectively including both of a first information element indicating a reception result for a transmitted signal of a process number and a second information element indicating a reception result for another transmitted signal of another process number different from the process number corresponding to the first information element from the radio communication entity; and a judging unit that judges a reception result of the transmitted signal in accordance with the first information element of the response signal corresponding to the process number and the second information element of another response signal corresponding to the another process number different from the process number corresponding to the first information element.

16. The radio communication apparatus according to claim 15, wherein said judging unit includes a weighting combining section for making a weighting combination of the second information elements.

17. The radio communication apparatus according to claim 15, wherein said judging unit makes a weighting combination among the first and second information elements; and judges the reception result in accordance with the result of the weighting combination.

18. The radio communication apparatus according to claim 16, wherein said judging unit makes a weighting combination among the first and second information elements; and judges the reception result in accordance with the result of the weighting combination.

\* \* \* \* \*